United States Patent [19]

Olson et al.

[11] Patent Number: 4,589,523

[45] Date of Patent: May 20, 1986

[54] FALL ARRESTER AND EMERGENCY RETRIEVAL APPARATUS AND ANCHOR APPARATUS THEREFOR

[75] Inventors: Wayne L. Olson, Evergreen; Billy R. Hensley, Lakewood, both of Colo.

[73] Assignee: Rose Manufacturing Company, Englewood, Colo.

[21] Appl. No.: 578,963

[22] Filed: Feb. 10, 1984

[51] Int. Cl.⁴ .......................... F16D 59/00; A62B 1/10

[52] U.S. Cl. ...................................... 182/234; 182/239

[58] Field of Search .................... 182/234, 239, 5, 237, 182/232, 75, 236

[56] References Cited

U.S. PATENT DOCUMENTS

| | | | |
|---|---|---|---|
| 1,950,288 | 3/1934 | Benson | 182/142 |
| 2,518,934 | 8/1950 | Renner | 182/234 |
| 2,802,637 | 8/1957 | Gschwind | 182/237 |
| 3,760,910 | 9/1973 | Koshihara | 182/237 |
| 3,915,432 | 10/1975 | Bustamante | 182/239 |

OTHER PUBLICATIONS

The Universal Tripod, Butco, 12/17/79.

*Primary Examiner*—Reinaldo P. Machado
*Attorney, Agent, or Firm*—Jerry W. Berkstresser; Bruce G. Klaas

[57] ABSTRACT

A fall arrester and emergency retrieval apparatus and a support tripod therefor, wherein an emergency retrieval assembly is operably associated with a clutch-brake type cable drum to enable cable dispensed from the cable drum and supporting a worker, subsequent to a fall to be selectively drawn in or extended from the assembly. The invention may comprise actuation assembly designed to hamper disengagement of the emergency retrieval assembly from the cable drum by unauthorized personnel subsequent to engagement and use of the emergency retrieval assembly. A specially adapted tripod assembly is described for anchoring the fall arrester and emergency retrieval apparatus which allows the apparatus to be mounted on a leg portion thereof or suspended from a central portion thereof, for facilitating use of the fall arrester and emergency retrieval apparatus in confined entry applications.

31 Claims, 22 Drawing Figures

FALL ARRESTER AND EMERGENCY RETRIEVAL APPARATUS AND ANCHOR APPARATUS THEREFOR

BACKGROUND OF THE INVENTION

The present invention relates generally to workplace personnel fall arresters of the retractable lifeline type and more particularly to a combined personal fall arrester and emergency retrieval apparatus capable of arresting a person's fall from a height, suspending the person after fall arrest, and thereafter capable of assisted retrieval of the suspended fallen person by raising or lowering him to a selected position within the apparatus' range to facilitate rescue. The apparatus is capable of being selectively used as either a fall arrester only with back-up emergency retrieval capability or an emergency retrieval device with back-up fall arrester capability that can be used to retrieve several persons, one at a time, without necessarily depending on self-assistance of the person or persons being retrieved. The present invention also generally relates to means of anchoring and rigging the fall arrester and emergency retrieval apparatus and more particularly to portable tripod anchorage means for mounting the apparatus.

Fall arresters of various types have long been in use in working environments in which a worker is exposed to the hazard of falling from a height. Fall arresters, of the retractable lifeline type dealt with herein, typically comprise a clutch-brake type cable drum mounted within a housing. The fall arrester is attached to an anchorage, usually a fixed structural member, and the free end of a cable, which is wound about the cable drum, is attached to a body harness worn by the worker. The cable drum is generally biased in the direction of rotation opposite to that in which the cable is payed out to prevent slack from developing in the cable as the worker descends or ascends. A clutch-brake type cable drum has the design characteristic that when the speed at which the cable is payed out reaches a predetermined value, the rotation of the cable drum is braked to a halt at a predetermined deceleration rate. The rate of deceleration is set to brake the fall relatively quickly yet not so rapidly as to give rise to high decelerative forces being applied to the falling person. After braking, the cable drum is restrained from rotation until the downward load on the cable is removed.

Thus, if a worker attached to a fall arrester cable falls from a supported position, his fall is arrested as soon as his fall velocity causes the cable drum to reach a predetermined rotational speed. Subsequent to the fall and fall arrest, the fall victim is suspended by the cable at a fixed elevation. If the fall victim is unconscious, injured or otherwise physically unable to grasp a nearby structure, such as a ladder or the like, to regain a supported position, he must rely on others to remove him from his suspended position. Raising or lowering a fall victim can be very difficult, such as in egress from confined spaces where a worker has descended through a manhole. Typically, other persons above the fall victim, where the fall arrester is mounted, lower another line and the fall victim attaches it to his harness whereupon the persons above raise him from his suspended position. If the fall victim is helpless, it is generally necessary for another person to descend or be lowered to the fall victim to attach a rescue line to his harness. Another method of rescue is for those who are at the elevated position to simply haul in the fall arrester cable in a hand-over-hand manner to raise the fall victim. In some applications such as where overhanging objects are present which would interfere with the fall victim's ascent or where the fall victim is suspended a few feet above a lower base surface, it is desirable to lower the victim rather than raise him from the suspended position. In this case, it is necessary to first raise the fall arrester cable a slight amount to remove the load on the cable drum and then to slowly lower the worker, again in a hand-over-hand manner or with the aid of a second line, until the worker reaches the lower support surface. Raising or lowering a fallen worker from a suspended position at the end of the fall arrester cable thus usually requires the services of several people and can be very hazardous, awkward and time-consuming.

OBJECTS OF THE INVENTION

It is important to provide an emergency retrieval capability for use in association with a fall arrester which would allow a fall victim to be conveniently and quickly raised and/or lowered to a predetermined support position subsequent to a fall. It is necessary that such a system be highly reliable and preferably be operable by a single individual in a manner which does not require a great amount of strength or effort. It is an object of the present invention to provide a fall arrester equipped with such an emergency retrieval capability. It would also be required to have the fall arrester and emergency retrieval apparatus inspected subsequent to every use in which a fall victim is retrieved. It is an object of the present invention that actuation of the emergency retrieval assembly would automatically identify to the user that the emergency retrieval assembly has been actuated and that the fall arrester and emergency retrieval apparatus must be removed from further use after the instant emergency until an inspection, service and resetting of the apparatus is performed by authorized personnel. In the instant emergency, the apparatus can be used repeatedly in the emergency retrieval mode to retrieve other personnel (apart from the fall victim) situated in the same instant emergency environment by rescuer assistance in lowering the cable to other victims in the environment or descending repeatedly with the cable to attach it to the harness (one at a time) of other victims. It is a further object of the present invention that the fall arrester and emergency retrieval apparatus is mountable on a fixed structural member or a stable, portable structure that may be situated above confined space entry openings, such as hatches or manholes, in a manner to facilitate use of the fall arrester and emergency retrieval apparatus.

SUMMARY OF THE INVENTION

The present invention comprises a fall arrester and emergency retrieval apparatus which may be used to clutchingly brake a worker's fall from a height and which may be subsequently used to raise or lower a worker to a predetermined support position.

A fall arrester assembly of the invention includes a clutch brake type cable drum, rotatable in two directions, designed to be actuated at a predetermined rotational speed in one direction, which causes a victim's fall to be arrested, and which, subsequent to arresting the fall, causes the brake drum to be maintained in a fixed position of rotation until the force applied to the cable by the victim's weight is temporarily removed. The cable drum is of a type which is effectively "reset"

by removal of the load from the cable, which again allows rotation of the drum in a cable unwinding direction up to the predetermined speed. The cable drum is mounted within a housing means which may be fixedly suspended from a support structure such as a portable tripod or fixed structural member or which, in a preferred embodiment, is mounted on a leg portion of a specially adapted tripod with the cable of the fall arrester and emergency retrieval apparatus suspended from a pulley at a central point on the tripod. The mounting of the fall arrester and emergency retrieval apparatus on the leg of the tripod, in the preferred embodiment, is accomplished by use of a specially adapted bracket device which places the apparatus in an easily accessible location and facilitates operation of the apparatus in the emergency retrieval mode.

An emergency retrieval assembly is mounted on the fall arrester in engageable relationship with the cable drum through a drum gear. The emergency retrieval assembly is not engaged with the drum gear during conventional use of the fall arrester and emergency retrieval apparatus in the fall arrest mode. However, after a fall has been sustained and the fall arrester assembly has been activated, then the emergency retrieval assembly may be engaged with the cable drum through the drum gear. More precisely, after the emergency retrieval assembly has been actuated into engagement with the drum gear, it may not be disengaged from the drum gear except through use of a special tool which is preferably not available at the job site. Thus, after the emergency retrieval assembly has been engaged, the fall arrester and emergency retrieval apparatus is no longer operable in a pure fall arrester mode and must therefore be removed from service and sent to authorized personnel for inspection, service and subsequent resetting.

The fall arrester and emergency retrieval apparatus includes a drum gear mounted on an outer face surface of the cable drum. As stated above, the emergency retrieval assembly does not engage the fall arrester assembly when the apparatus is being used as a conventional fall arrester. However, once the fall arrester assembly has been activated in arresting a worker's fall, the rescuer may, by following a procedure described hereinbelow, cause the drum gear to be positively engaged by a pinion gear which is attached to a gear shaft in a manner causing it to rotate with the ratchet gear shaft. A drive means such as a conventional crank handle is attached to a nut which is threadingly associated with the ratchet gear shaft through a clutch. The threadable nut is part of a clutch assembly which in operation causes the ratchet gear shaft to be engaged with or disengaged from a ratchet gear positioned about the ratchet gear shaft. The ratchet gear is free to rotate in only one direction about the ratchet gear shaft due to its co-action with adjacent ratchet pawls.

The construction and arrangement of the clutch mechanism of the emergency retrieval assembly is such that when the drive means is rotated in one direction, the ratchet gear of the clutch assembly causes both the drive means and the ratchet gear shaft to gradually engage the ratchet gear by friction. After the rotation of the drive means has caused fixed engagement of the drive means, ratchet gear and ratchet gear shaft (i.e. the three turn together as a unit), subsequent rotation of the drive means in the same direction causes rotation of the pinion gear and, in turn, the drum gear and thus rotation of the cable drum in a direction which winds the cable onto the drum and thus raises a worker suspended by the cable. When the clutch assembly is in this tightened relationship which causes engagement of the drive means, ratchet gear and ratchet gear shaft, the ratchet gear shaft is prevented from rotating in a direction associated with unwinding of the cable due to its coaction with associated ratchet pawls. Thus, the ratchet gear shaft is also prevented from counter rotating as a victim is being raised.

If the drive means is rotated in the opposite direction, i.e. in a direction to loosen the engagement between the ratchet gear shaft and ratchet gear, a controlled slipping engagement is provided between the ratchet gear shaft and ratchet gear which allows the cable on the cable drum to be slowly payed out. The construction and arrangement of the clutch mechanism is such that this slipping rotation is self-terminating. That is to say, rotation of the cable drum during this slipping engagement of the ratchet gear shaft and ratchet gear again causes the clutch mechanism to increase the frictional engagement between the ratchet gear shaft and ratchet gear which terminates the slipping rotation therebetween. Thus, the drive means must be continuously rotated in a friction-relieving direction in order to provide a continuous extension of cable from the cable drum. If the loosening rotation of the drive means is suspended, the clutch mechanism of the emergency retrieval assembly automatically gradually terminates the descent of the cable. Thus, a braking mechanism and a limited shock absorbing mechanism is provided by the emergency retrieval assembly. This braking mechanism and shock absorbing mechanism in the emergency retrieval assembly is independent of and does not cooperate with the fall arrester assembly and its clutch-brake mechanism.

In its preferred method of operation, the emergency retrieval assembly subsequent to engagement with the fall arrester assembly drive means is initially rotated the direction which causes the cable to be wound onto the cable drum in order to "reset" the drum. Thereafter, the drive means may be rotated either to raise or lower the victim in the manner described above. However, it is another feature of the inventor that if the drive means is not initially rotated in the cable wind up direction but is instead rotated in the direction associated with loosening of the clutch, the emergency retrieval apparatus is still functional. If, immediately subsequent to engagement of the emergency retrieval assembly with the fall arrester, the emergency retrieval assembly drive means is rotated in the clutch loosening direction it will initially loosen the retrieval assembly clutch. However, this clutch loosening will be without effect on the cable drum which is held stationary by its internal clutch-brake assembly. However, further rotation of the drive means in the retrieval assembly clutch loosening direction will cause the drive means to engage a drive means stop which is affixed to the ratchet gear shaft. Upon engaging this stop further rotation of the drive means in the same direction causes a nonslipping rotation of the ratchet gear shaft. The cable drum which is now positively engaged with the ratchet gear shaft is forced to rotate in the cable pay out direction. The rotation of the cable drum in this mode of operation however only occurs if the force applied to the drive means is sufficient to override the resistance of the internal cable drum clutch brake.

Thus, it may be seen that a fall arrester and emergency retrieval apparatus is provided which has a retrieval assembly which is actuatable in an emergency situation to raise or lower a victim subsequent to the "locking" of the fall arrester cable drum clutch-brake assembly by either "resetting" of the cable drum clutch brake assembly and subsequent raising or lowering of a victim in one mode of operation or by "overriding" the cable drum clutch-brake assembly to lower the victim in another mode of operation.

BRIEF DESCRIPTION OF THE DRAWING

An illustrative and presently preferred embodiment of the invention is shown in the accompanying drawings in which.

DETAILED DESCRIPTION OF THE INVENTION

Figures 1, 1A:
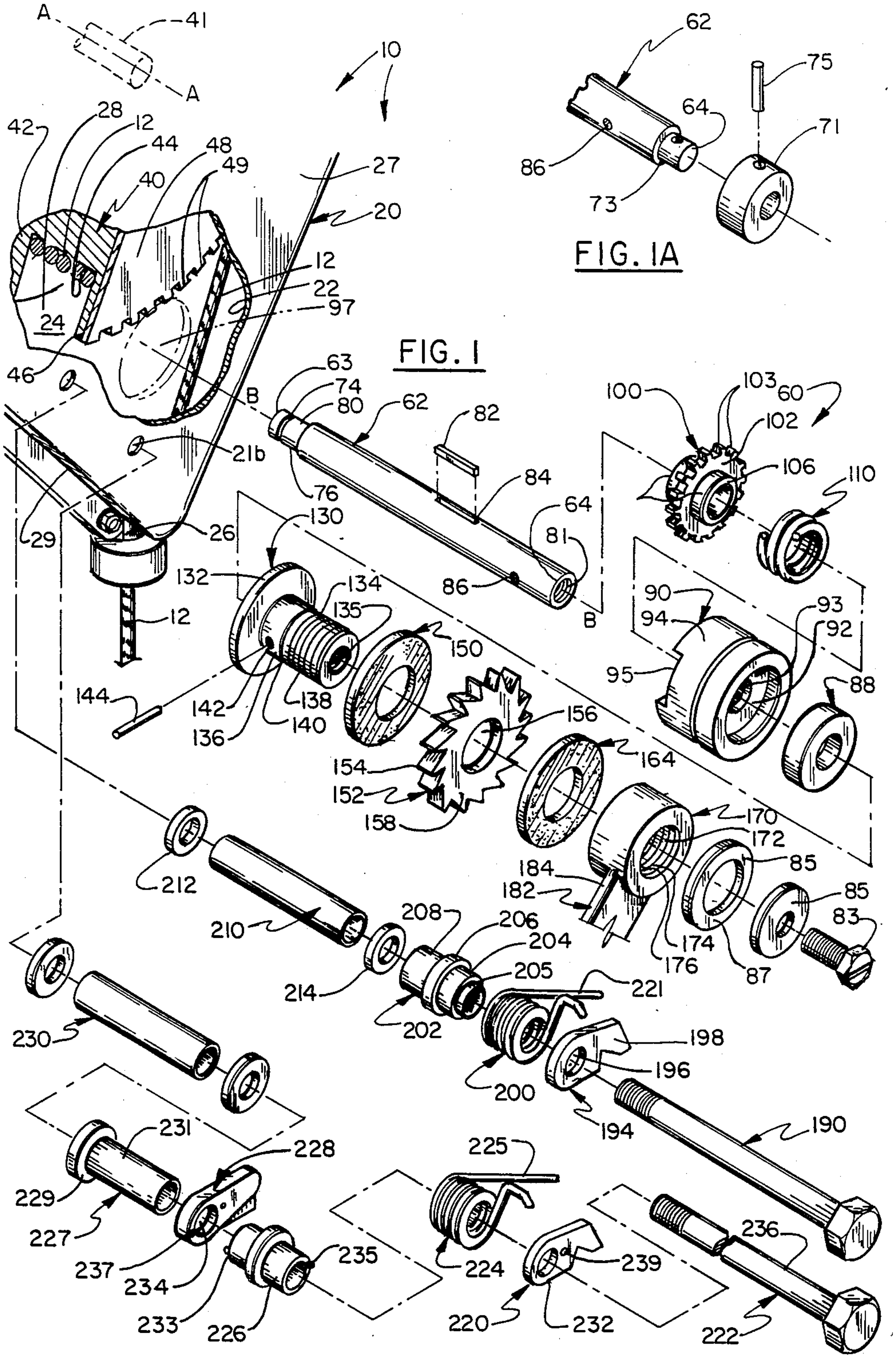
FIG. 1 is an partially-exploded and partially cut-away perspective view of a fall arrester and emergency retrieval apparatus.
FIG. 1A is an alternate view of an end portion of a ratchet gear shaft.

The fall arrester and emergency retrieval apparatus 10 of the present invention comprises an extendible and retractable line means such as cable 12 which is adapted as by snap hook 14 or the like to be connectable to a harness 16 worn by a worker. In a different application in which the retrieval assembly is always engaged with the fall arrester assembly and the apparatus is used for cargo handling, the cable would be attached to a load of cargo. The term "pay load" may at times be used herein to refer to any weight attached to the fall arrester cable and thus includes worker or cargo type applications. The cable 12 is wrapped about a drum means such as clutch-brake type cable drum 40 which is rotatably mounted, as by fixed drum shaft 41 having central axis AA, between opposite walls 22, 24 of housing unit 20. The cable drum 40 has the characteristic that it exerts a biasing torque in a direction opposite to the direction in which the cable is unwound or "payed out". Thus, the cable 12 is maintained under a constant state of nominal tension to prevent cable slack. Structure for applying such torque to a cable drum is well-known in the art and may include, for example, a coiled torsion spring 45 attached at one end to the cable drum and at the other end to fixed drum shaft 41. The cable drum is also provided with rotational speed sensing apparatus such as, for example, centrifugally actuated and/or cam actuated pawls 47, etc. which are pivotally mounted on a brake plate 49 which is in turn rotatably mounted on drum shaft 41, FIGS. 5 and 6. Pawls 47 are biased as by biasing springs 53, etc., in a manner such that the end of the pawl opposite the spring attachment is positioned in non-engaging contact with pawl engaging shoulder portions 50, etc. of engager plate 51. The end of the pawl which is attached to biasing spring 53 is adapted to extend around and beneath the outer periphery of engager plate 51 and is contacted by surface portions 51A, FIG. 5, of the lower periphery of engager plate 51 as it spins. Brake plate 49 may rotate relative to drum shaft 41 under force but is normally stationary until pawls 47 engage the engager plate and sufficient force is applied therebetween. Engager plate 51 is fixedly attached as by bolts 52 to a fixed frame portion of cable drum 40. Thus, as the cable drum rotates, engaged plate 51 also rotates. The end of pawl 47 attached to biasing spring 53 is deflected outwardly by impact with a rotating lower radial portion 51A of plate 51 a distance which is dependent on the speed of rotation of the cable drum. At a sufficient amount of deflection, pawl 47 engages an engaging shoulder 50 on the engager plate upper periphery, thus causing the pawl and attached brake plate 49 to begin rotating at the same speed as cable drum 40. Posts 54 are fixedly attached to brake plate 49 and engage a plurality of small thickness relatively large diameter clutch plates 55, etc. Sandwiched between clutch plates 55, etc. are a plurality of relatively smaller diameter friction plates 56, etc. which are keyed to drum shaft 41 and are thus non-rotatable relative the drum shaft and housing unit. Rotation of brake plate 49 and clutch plates 55 engaged through posts 54 is thus resisted by frictional engagement between friction plates 56, etc.

and clutch plates 55, etc. Thus, the engagement of brake plate 49 causes rotation of the cable drum to be rapidly decelerated and stopped. The amount of frictional force between clutch plates 55 and friction plates 56 may be preset as by pressure assembly 57 transmitting pressure to the clutch plates and friction plates when pressure nut 57*a* is threaded down on drum shaft 41. Thus, it may be seen that upon reaching a predetermined speed of rotation, the cable drum clutch-brake mechanism is actuated and causes the cable drum to be gradually decelerated to a velocity of 0 in a very short time. After the cable drum is decelerated, it remains in a "locked" position (i.e. a position held rotatably stationary) by coaction of pawls 47 and engaging shoulders 50 and allows no further extraction of cable 12 until the downward load being applied to cable 12 by the workman's suspended weight is reduced below the biasing force of coiled torsion spring 45. Removal of the downward load allows pawls 47 to be retracted by biasing springs 53 and the cable drum is again rotatable, as described above, up to the predetermined speed at which point the clutch-brake mechanism is again actuated, etc.

The structure and method of operation of a clutch-brake type cable cable drum such as drum 40 is well-known in the art. A fall arrester having this type of clutch-brake arrangement is commercially available through Rose Manufacturing Company, 2250 South Tejon Street, Englewood, Colo. 80110 under the trademark DYNA-LOCK.

Figure 2:
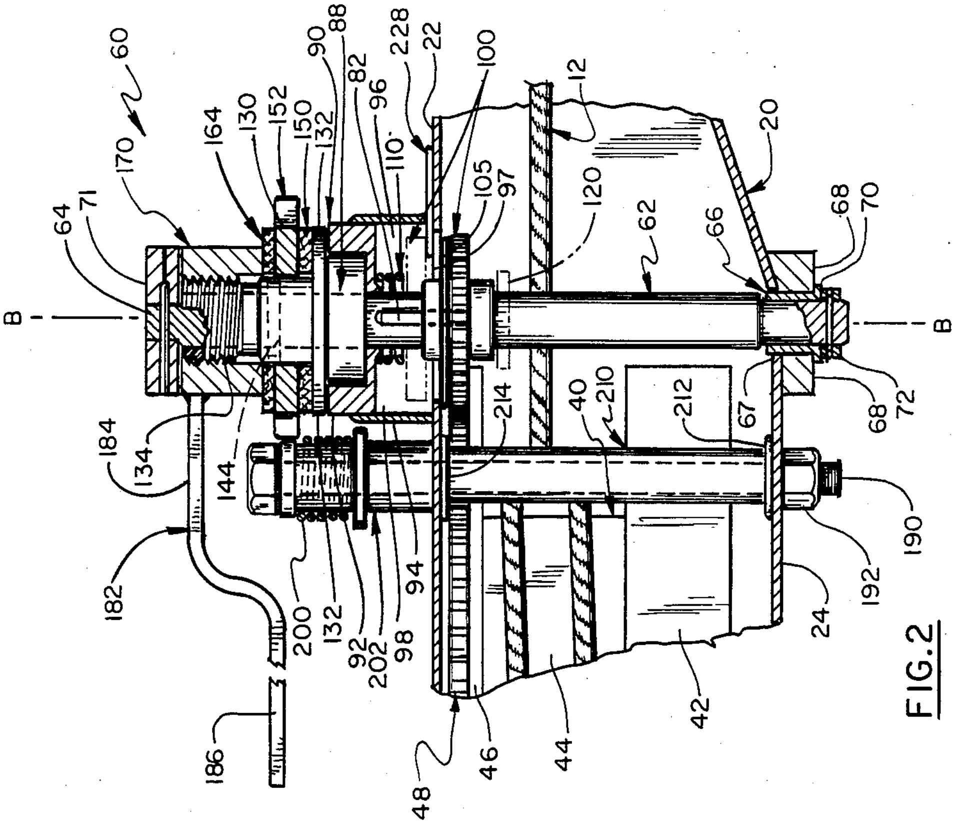
FIG. 2 is a cross-sectional side elevation view of an emergency retrieval assembly.

The fall arrester and emergency retrieval apparatus 10 of the present invention is provided with an emergency retrieval assembly 60 as illustrated in FIGS. 1 and 2. The emergency retrieval assembly comprises a rotatable ratchet gear shaft 62 having an axis of rotation BB mounted in parallel relationship with the axis of rotation AA of cable drum 40. Ratchet gear shaft 62 is rotatably mounted within housing unit 20 as by sleeve 66, FIG. 2, and fixed shaft bearing 88 received in a bearing housing 90. A pinion gear 100 is attached to the ratchet gear shaft 62 in rotatably fixed, axially displaceable relationship therewith. The pinion gear 100 is adapted to be selectively positively engaged with a drum gear 48. The pinion gear 100 is normally positioned in an axially outwardly located, disengaged orientation as illustrated by the phantom lines in FIG. 2. However, when the emergency retrieval assembly 60 is to be utilized, a gear detent 228 is radially deflected allowing a biasing means such as pinion gear actuator spring 110 to move pinion gear 100 into engaging relationship with drum gear 48 at a position illustrated by the solid lines of FIG. 2. Thus, when gears 100 and 48 are engaged, rotation of ratchet gear shaft 62 causes rotation of cable drum 40 and visa versa. A clutch plate and sleeve member 130 having a T-shaped cross-section is fixedly attached to ratchet gear shaft 62 as by a pin and, in turn, receives an inner clutch/brake pad 150, a ratchet gear 152, and an outer clutch/brake pad 164 in rotatably and axially displaceable relationship thereabout. The upper portion of clutch plate and sleeve member 130 is threaded and receives a threaded nut 170 thereon which may be urged into contacting engagement with the outer clutch/brake pad 164 by threading rotation. A handle means 182 or other drive means may be fixedly attached to threaded nut 170 to facilitate rotation thereof in either direction and to act as a torque resistor to prevent the rotation of the threaded nut 170 in certain modes of operation as will be discussed in further detail hereinafter. Axially inward movement of threaded nut 170 causes increasingly greater pressure and resultant increasingly greater frictional contact between the clutch plate radially extending plate portion 132, clutch/pad 150, ratchet gear 152, outer clutch/brake pad 164 and threaded nut 170. After sufficient axially inward movement of nut 170, the frictional contact between these components is sufficiently high so as to cause ratchet gear 152 to be rotationally fixed relative clutch plate and sleeve member 130 and threaded nut 170. Thereafter, any further rotation of threaded nut 170 in a tightening direction (clockwise in FIG. 1) causes a coinciding and equal amount of rotation of ratchet gear 152. A pair of pawls 194 and 220 are operably associated with ratchet gear 152 so as to allow rotation of the ratchet gear only in the direction of rotational tightening movement of threaded nut 170, see FIGS. 3 and 4 (first pawl 194 not shown in FIG. 4). Thus, after threaded nut 170 has reached a sufficient axially downward position, further rotation of threaded nut 170 causes clutch plate and sleeve member 130 and ratchet gear 152 and ratchet gear shaft 62 (which is fixedly attached to clutch plate and sleeve member 130) to rotate as a unit. When gears 48 and 100 are engaged, this rotational movement of ratchet gear shaft 62 (clockwise in FIGS. 1 and 3) causes cable 12 to be wound in, thus raising a worker who is connected to the cable. When the rotating force on the drive means, handle 182, is removed, the gears 48 and 100 and cable drum 40 do not counter rotate after a resistance force is applied by first pawl 194 or second pawl 220 to ratchet gear 152. Gears 48 and 100 and cable drum 40 will counter rotate slightly until either pawl 194 or 220 seats between teeth of ratchet gear 152. Once pawl 194 or 220 is seated between two adjacent teeth of ratchet gear 152, back pressure caused by transmission of the worker's suspended weight through cable 12 and gears 48 and 100 into the clutch means causes frictional locking and prevents any lowering of the suspended worker.

When threaded nut 170 is rotated in the opposite direction, (counter clockwise in FIGS. 1 and 3) pawls 194 and 220 resist rotational movement of ratchet gear 152, thus causing threaded nut 170 to be "unthreaded", i.e. rotatably, axially outwardly repositioned on threaded portion 138, relative ratchet gear 152 and clutch plate radially extending plate portion 132. The friction between ratchet gear 152 and the clutch plate radially extending plate portion 132 of clutch plate and sleeve member 130 causes a resistance to rotation of ratchet gear shaft 62 in a counter clockwise direction. However, as this friction between ratchet gear 152 and clutch plate radially extending plate portion 132 is reduced by the unthreading of threaded nut 170, ratchet gear shaft 62 becomes progressively easier to rotate in a counter clockwise direction. When the amount of torque necessary to rotate ratchet gear shaft 62 in a counter clockwise direction becomes less than the torque being applied to ratchet gear shaft 62 by the cable load through cable drum 40, drum gear 48 and pinion gear 100, then ratchet gear shaft 62 begins to rotate. However, this rotation of ratchet gear shaft 62 causes rotation of clutch plate and sleeve member 130 as well (member 130 is pinned to ratchet gear shaft 62). If threaded nut 170 is maintained in a fixed position relative housing unit 20, then the rotation of ratchet gear shaft 62 and clutch plate and sleeve member 130 causes threaded nut 170 to be again axially tightened about the threaded portion of member 130, thus increasing the pressured induced friction between member 130 and ratchet gear 152. This increase in friction, of course, again increases the amount of torque needed to rotate ratchet gear shaft 62 and thus resists and eventually stops the rotation of shaft 62 and the associated rotation of the cable drum 40. Thus, controlled amounts of downward extension of cable 12 may be allowed by slowly unthreading threaded nut 170 to allow rotational slippage between plate 130 and ratchet gear 152. This permits rotation of cable drum 40 and thus extension of cable 12 therefrom. However, if threaded nut 170 is held stationary, then the rotation of cable drum 40 also again threadingly tightens the threaded nut 170. This in turn slows and stops the downward extension of cable 12 until the threaded nut 170 is further unthreaded by rotation of handle means 182. Thus, a payload suspended by cable 12 may be payed out subsequent to fall arrest and "locking" of cable drum 40 in several different "cable extension modes". In a one cable extension mode the cable drum is "reset" by initial cable retraction and subsequent rotation in a cable unwinding direction at a relatively slow rate so that there is little or no rotation of the threaded nut 170 relative ratchet gear shaft 62 after it starts to rotate.

In another cable extension mode, the cable drum 20 is reset by initial cable retraction (clockwise rotation, FIG. 1) as in the first cable extension mode but subsequent rotation of the drive means and threaded nut 170 in the cable extension direction (couterclockwise, FIG. 1) takes place at a relatively rapid rate such that threaded nut 170 initially rotates faster than the ratchet gear shaft 62. However, this initial rapid rotation of nut 170 relative the shaft 62 creates an imbalance in the clutch allows assembly which causes the drum to rotate freely in response to the load on the cable. This rotation of the cable drum of course, causes the shaft 62 to begin to rotate and it soon rotates at a more rapid rate than the nut until the clutch assembly again starts to be engaged and slows the rotation of the cable drum and ratchet gear shaft 62. Thus, in the second unwinding mode, the cable is extended in a discontinuous manner with periods of acceleration followed by periods of gradual deceleration and stopping. If the cable ever accelerates to a velocity exceeding the present velocity limit of the cable drum internal clutch/brake assembly, it will, of course, actuate the cable drum clutch brake assembly and be decelerated thereby. Actuation of the cable drum internal clutch brake assembly will, of course, cause the drum to "lock" and would require resetting for further cable extension in either the first or second cable extension modes.

In a third cable extension mode, the drive means and threaded nut 170 are not initially rotated to cause cable retraction and resetting of the "locked" cable drum 20. Rather, the drive means and threaded nut are initially rotated in the cable unwinding direction. During this initial rotation, the shaft 62 is held rotatably fixed by the locked cable drum 20 and associated gears 48, 100 and thus rotation of threaded nut 170 causes it to be axially outwardly deplaced until it engages drive means stop means such as washer 87, FIG. 2. Thereafter, further rotation of the drive means and threaded nut 170 in the cable unwinding direction must be accompanied by rotation of ratchet gear shaft 62. However, since shaft 62 is engaged with locked cable drum 20, the rotating force on the drive means must be sufficient to override the resistance to rotation of the internal clutch/brake assembly of drum 20. If the force applied to the drive means is sufficient, then the cable drum will be rotated in a direction to unwind cable. But, of course, as soon as this force on the drive means is removed, the clutch/-brake assembly of drum 20 will again stop the drum rotation.

Figure 5:
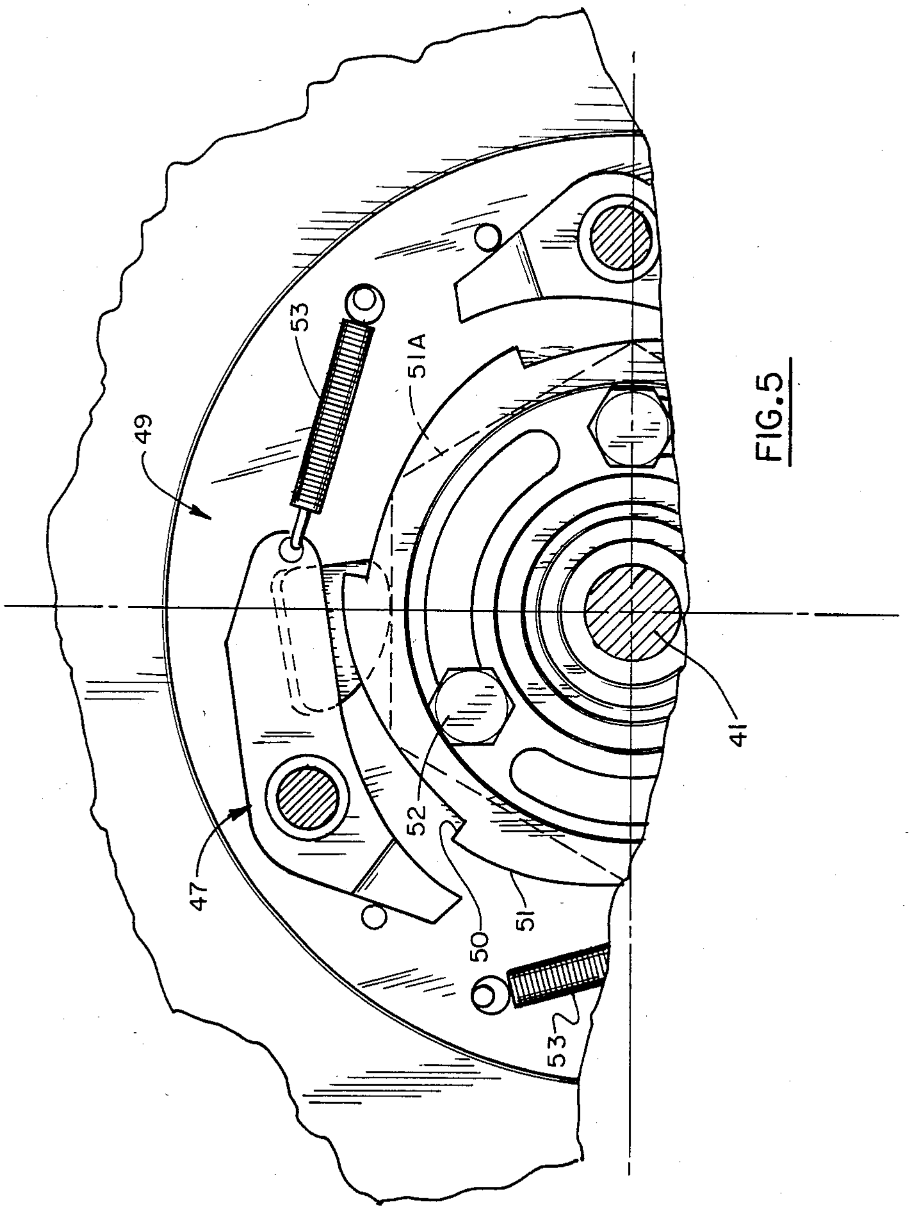
FIG. 5 is a detail cut-away front elevation view of brake and clutch components of a fall arrester assembly.
Figure 6:
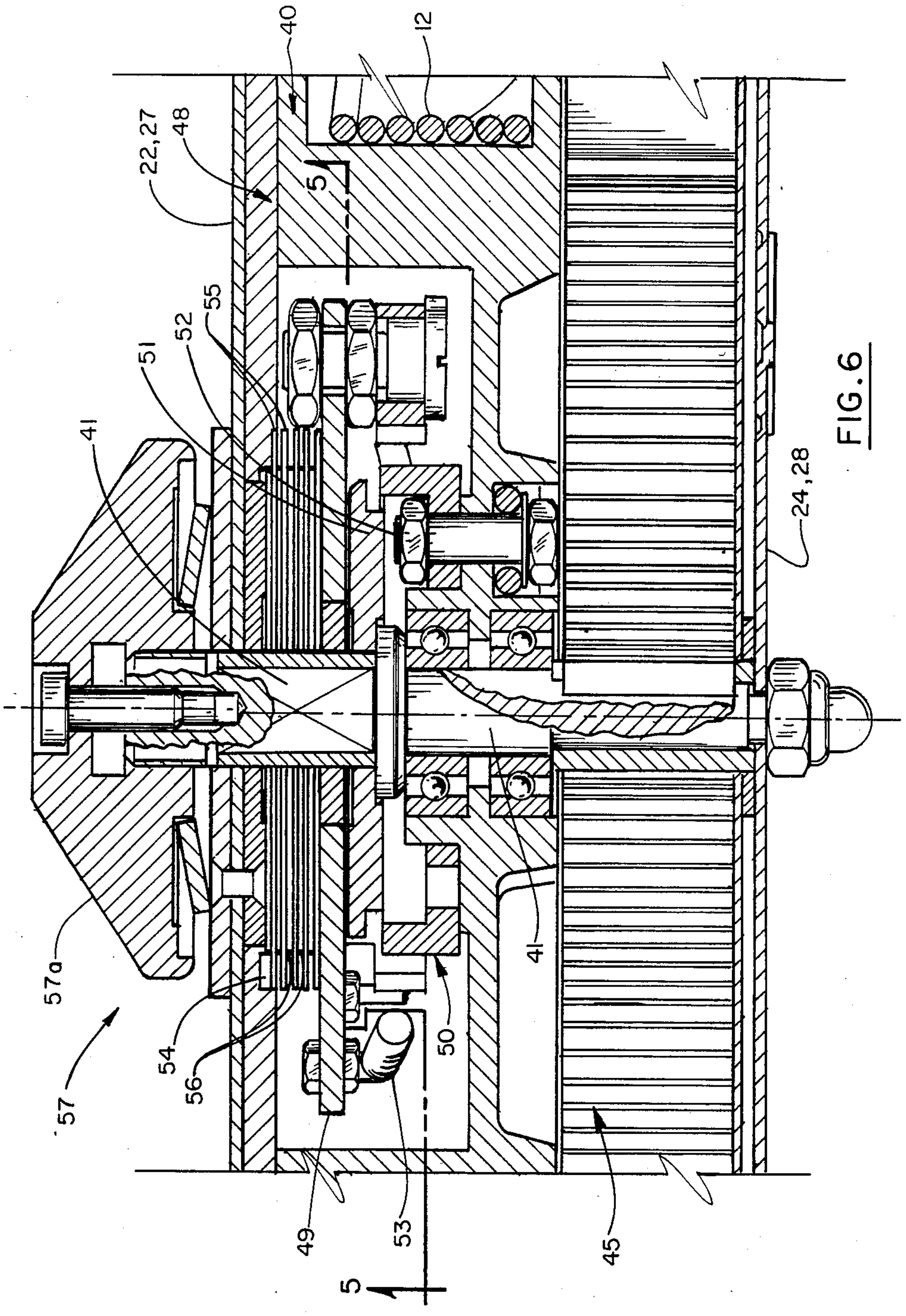
FIG. 6 is a detail cross-sectional side elevation view of brake and clutch components of a fall arrester assembly.

Having thus described the structure and operation of the invention in general, specific components of the invention will now be described in further detail. As shown in FIGS. 1, 2, 3, 11 and 12, housing means 20 may comprise a generally tear-dropped shape profile having a housing installation connector portions 25 positioned at one end thereof and a cable receiving portion 26 positioned at the end opposite the installation connector portion. The housing means may comprise two separate halves 27, 28, FIG. 11, each having a large flat wall portion 22, 24 and a peripheral wall portion 29 and 30, FIGS. 2, 11. The peripheral walls are connectable to one another as by bolts, rivets or other conventional attachment means well known in the art. A drum shaft 41, FIGS. 1, 5 and 6, is fixedly supported by opposite housing walls 22 and 24 and in turn rotatably supports cable drum 40 thereon as described above.

Cable drum 40 as illustrated by FIGS. 1 and 2 comprises a spring housing portion 42 of relatively large radius, a cable collection portion 44 of somewhat smaller radius, and a flange portion 46 opposite cable collection portion 44 and of approximately the same radius as portion 44. A drum gear 48 having a plurality of circumferentially spaced teeth **49*a* is fixedly mounted on flange portion 46 in concentric relation therewith. In a preferred embodiment of the invention, the diameter of flange portion 46 is slightly larger in diameter than drum gear 48 for the purpose of abuttingly engaging pinion gear 100 to provide proper meshing of the two gears 100 and 48**.

A rotatable ratchet gear shaft 62 having a central axis of rotation BB is provided. The ratchet gear shaft is mountable at a first end 63 thereof in a sleeve 66 which is positioned adjacent housing wall 24, FIG. 2, at a location which enables it to extend through a bore portion 67 in the housing wall 24. Sleeve 66 may be prevented from rotating as by boss portions 68 fixedly attached to the housing wall and to sleeve 66. Rotatable ratchet gear shaft 62 may be securely retained within sleeve 66 as by bushing portion 70 of sleeve 66 received about end 63, and by snap ring 72, FIG. 2, received in snap ring groove 74 at a position axially outward of bushing portion 70. In a preferred embodiment, a shoulder portion 76 of ratchet gear shaft 62 engages an upper peripheral edge portion of sleeve 66 and smaller diameter shaft portion 80 is received in close rotatable engagement within sleeve 66. A spline key 82 is fixedly received within associated axially extending spline key groove 84 in ratchet gear shaft 62 in a conventional manner well known in the art. A pin receiving bore 86 is provided in the shaft at a position between end 64 and spline key groove 84. A threaded bore 81 at end 64 is provided for receiving retaining bolt 83 which in turn receives a pair of retaining washers 85, 87 thereabout which provides a stop means for stopping rotation and axially outward displacement of threaded nut 170 and allow operation of the emergency retrieval assembly in the third cable extension described above. Another embodiment of a stop means is shown in FIG. 1A in which a retainer ring 71 is mounted on a reduced diameter portion 73 of shaft 62 as by pin 75. In this embodiment, the reduced diameter portion 73 extends axially outwardly beyond the outer terminal end of member 130.

Annular shaft bearing 88 is fixedly attached to ratchet gear shaft 62 as by press fitting or other conventional means well-known in the art, at a position between spline key groove 84 and bore 86. A bearing housing 90 having a radially extending bearing receiving portion 92 with a central shaft receiving bore 93 therethrough and having an axially extending spacer portion 94 having a detent-receiving cutout 95 therein, is fixedly mounted as by welding or the like to the outer surface of housing wall 22 above a circular housing cutout 97 in wall 22, as shown in phantom in FIG. 1. The housing cutout 97 has a diameter slightly larger than the diameter of pinion gear 100. A clearance space of for example ⅝ inches is provided between the axially inner surface 98, FIG. 2, of the bearing receiving portion 92 and the outer surface of housing wall 22 to provide a sufficient space for receiving pinion gear 100 therewithin.

Pinion gear 100, as shown in FIG. 1, comprises a radially extending plate portion 102 having circumferential teeth 103 thereabout adapted to mate with the teeth 49*a* of drum gear 48. Pinion gear 100 also comprises a axially extending sleeve portion 104 which is integrally formed with plate portion 102 and which comprises an axially extending spline key receiving groove 106. Groove 106 coacts with spline key 82 to allow pinion gear 100 to be axially displaceable along ratchet gear shaft 62 and rotatably nondisplaceable with respect to the shaft.

A coil spring such as pinion gear actuator spring 110 is positioned about ratchet gear shaft 62 between pinion gear 100 and bearing receiving portion 92 and is of a sufficient axial length and of a sufficiently strong spring constant to bias pinion gear 100 into abutting contact with drum flange portion 46, FIG. 2. The radial distance between the axis of rotation AA of cable drum 40 and ratchet gear shaft 62 axis of rotation BB is such that pinion gear 100 operably meshes with drum gear 48 when pinion gear 100 is in the downwardly biased position shown in solid lines in FIG. 2. Pinion gear actuator spring 110 is also sufficiently compressible so as to allow the axially inward face of radially extending plate portion 102 to be positioned axially outwardly of a gear detent 228 which is positionable to cover cutout portion 97, FIG. 2 in phantom, as described in further detail hereinafter. It is preferred that the inward surface portion of radially extending plate portion 102 abuttingly engages the axially outer face of drum flange portion 46 when pinion gear 100 is engaged with drum gear 48. To provide redundancy, pinion gear 100 may be provided with an abutment plate 105, FIG. 2, affixed to an outer face surface of radially extending plate portion 102 which may abuttingly contact the axially outer surface of drum teeth 49 when the two gears 48, 100 are engaged. In another embodiment drum gear 48 comprises a diameter larger than flange portion 46 and pinion gear 100 is axially restrained in its biased position by a stop portion such as collar 120, shown in phantom in FIG. 2.

A clutch plate and sleeve member 130 is provided, having a generally T-shaped cross-section comprised of a radially extending plate portion 132 having an axially extending sleeve portion 134 and having a centrally extending bore 135 therethrough adapted to closely slidingly receive ratchet gear shaft 62. Sleeve portion 134 may in turn comprise a smooth surface portion 136 and a threaded portion 138. An intermediate neck portion 140 having a smaller diameter may be provided between portions 136 and portion 138. A pin bore 142 may be provided in smooth surface portion 136 and is adapted to be coaxially aligned with bore 86. Clutch plate and sleeve member 130 may thus be fixedly attached to ratchet gear shaft 62 as by pin 144 received within pin bores 142 and 86.

An annular clutch/brake pad 150, which may be made from conventional synthetic brake pad material or which may be made from rubber or other resilient material to provide greater shock absorbing capability, is rotatably and axially slideably mounted on clutch member sleeve portion 134 at a position adjacent plate portion 132. A ratchet gear 152 comprises a plurality of radially extending teeth 154 which are adapted to coact with pawls 194 and 220, as described in further detail hereinafter. The ratchet gear comprises a central bore 156 of slightly larger diameter than the diameter of clutch member sleeve portion 134 whereby it is freely rotatable and axially slideable relative sleeve portion 134. An inner face portion of ratchet gear 152 is positioned in adjacent touching contact with clutch/brake pad 150. An outer clutch/brake pad 164 which may have an identical configuration to that of clutch/brake pad 150 is positioned in adjacent contacting engagement with the ratchet gear outer face surface 158. In a preferred embodiment, clutch/brake pad 164 may be made to thickness and compressible material to provide greater shock absorbing capability.

A threaded nut 170 which may comprise a central bore 172 having a threaded portion 174 is threadingly attached to headed portion 138 with the axially inwardly positioned face of threaded nut 170 being abuttingly engageable with the axially outer face of outer clutch/brake pad 164. A drive means such as handle 182 is provided having a first end 184 which may be fixedly attached to threaded nut 170 and a second end 186 which may be grasped to rotate the handle.

Figure 13:
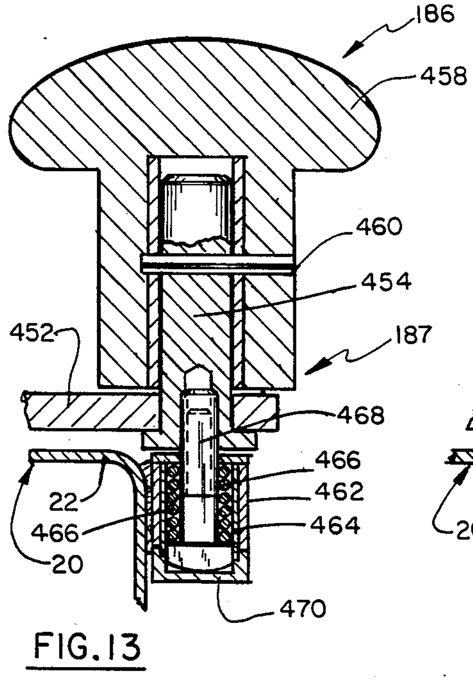
FIG. 13 is a detailed cross-sectional elevation view of a retrieval assembly handle and handle keeper assembly.
Figure 14:
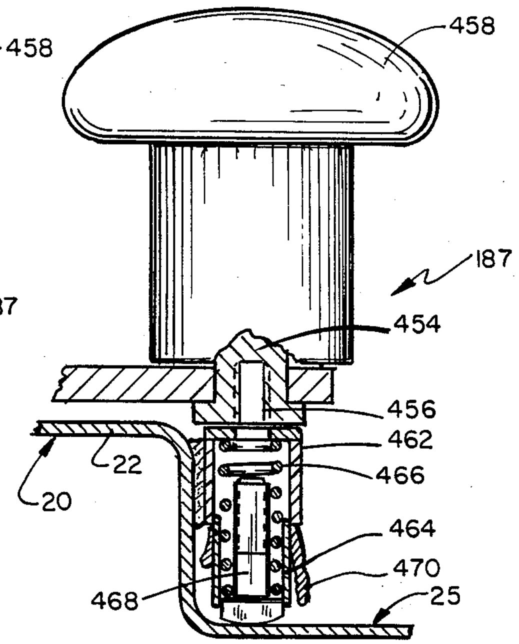
FIG. 14 is a detailed partially cross-sectional view of the handle and handle keeper of FIG. 13 in disengaged relationship.

As illustrated by FIG. 13 and FIG. 14, a handle keeper assembly 187 may be provided for retaining the handle second end 186 in a fixed position relative the housing 20 until the emergency retrieval assembly is to be actuated. The handle end 186 may comprise a handle arm portion 152 having a knob shaft 454 journalled thereto at substantially right angles therewith. The knob shaft 454 is thus freely rotatable about its central longitudinal axis. A threaded aperture 456, coaxial with the shaft 454 axis of rotation is provided at the lower end of knob shaft 454. A handle knob 458 may be fixedly attached to the knob shaft 454 for rotation therewith as by pin 460. The keeper assembly 187 may comprise an outer sleeve 462 fixedly attached to the housing 20 and telescoping receiving an inner sleeve 464 therewithin. A threaded bolt 468 is received within the inner sleeve 464 in axially slideable non-rotational relationship therewith, is threadingly engageable with knob shaft threaded aperture 456 by rotation of knob 458. A spring 466 received within inner sleeve 464 in annular relationship with bolt 468 causes the bolt and attached inner sleeve 464 to be biased outwardly to the position shown in FIG. 14. Thus, the inner sleeve 464 and bolt 468 may be urged upwardly as by a screw driver, etc. into a position where the bolt 468 engages threaded aperture 466 and thereafter knob 458 may be rotated to tighten bolt 468 within the aperture. When the handle end 186 is to be released, knob 458 is rotated in the opposite direction until bolt 468 is unthreaded and is moved to the position shown in FIG. 14 by the biasing force of spring 466. A seal means 470, such as for example a lead or plastic seal, may be provided at the lower end of the keeper assembly 187. Thus, it will be obvious to those initially obtaining the device as to whether the handle has been removed from the position shown in FIG. 13.

Figure 7:
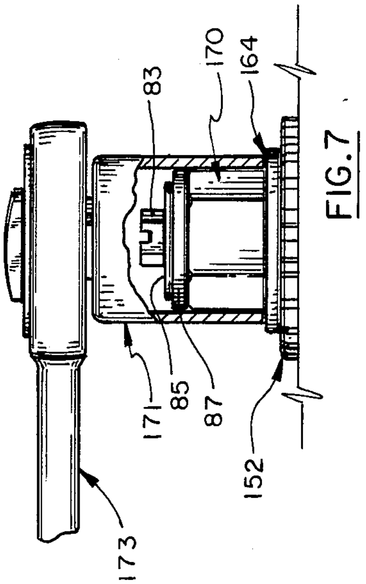
FIG. 7 is a detail cross-sectional side elevation view of an alternate construction of a handle means for an emergency retrieval assembly.
Figure 11:
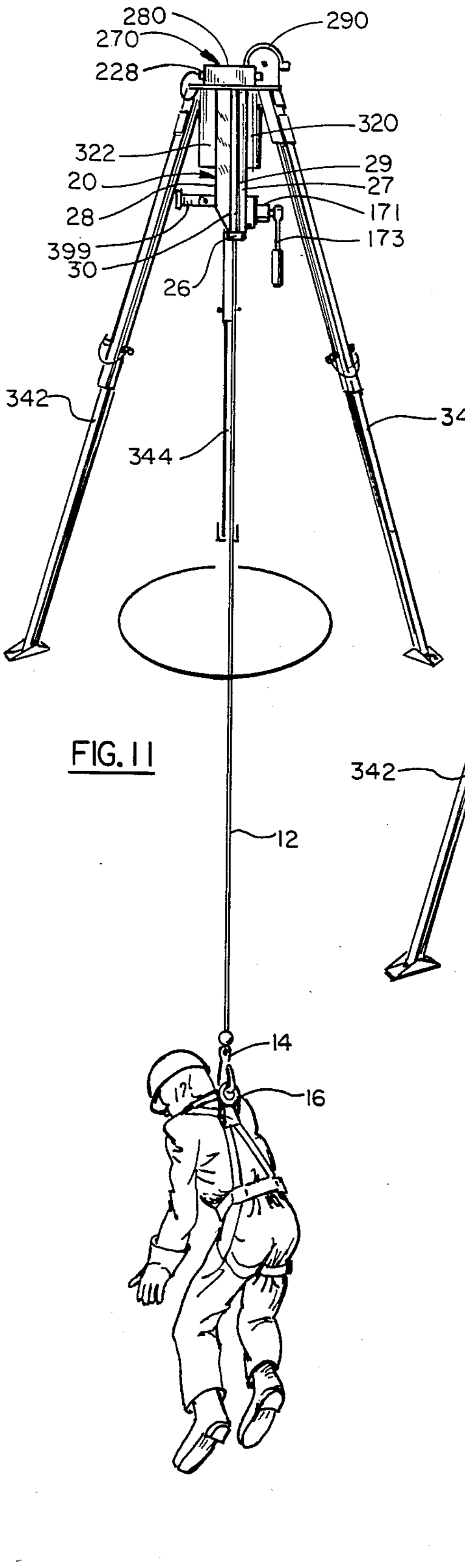
FIG. 11 is a schematic illustration of a fall arrester and emergency retrieval apparatus mounted on a central portion of a tripod apparatus supporting a suspended worker.

In another embodiment of the invention, as illustrated in FIGS. 7 and 11, threaded nut 170 may be provided with polygonal outer surface which may be engaged by a ratchet socket 171 and handle means 182 may be replaced by reversible ratchet 173 which is adapted to be received within socket 171 in a conventional manner well known in the art. In this embodiment threaded nut 170 may be rotated in either direction with relatively short arc ratchet movements as opposed to 360° handle rotation. In another embodiment a reversible ratchet 173 may be directly fixedly connected to threaded nut 170. In another embodiment, primarily applicable when the apparatus 10 is used for cargo handling the drive means may be a reversible motor.

As illustrated by FIGS. 1–4, a first pawl 194 having a bore 196 at one end thereof and having a pointed ratchet engaging portion 198 at the other end thereof is rotatably mounted on a spacer sleeve 200 which is in turn mounted on a first pawl bolt 190. Bolt 190 is received through bore portions in first pawl 194, first pawl spring 200, pawl spacer sleeve 202, load sleeve 210 and washers 212 and 214. The first pawl 194 is rotatably mounted about an upper neck portion 205 of spacer sleeve 202 and is biased inwardly against the ratchet gear 152 by a biasing means such as first pawl torsion spring 200 which is received on pawl spacer sleeve 202 at an upper spacer portion 204 thereof. The torsion spring is axially supported by a shoulder portion 206 of spacer sleeve 202. A lower spacer portion 208 of sleeve 202 engages housing wall 22 at an outer surface thereof. A load sleeve 210 is positioned between opposite bore portions 216, FIG. 1, (only one shown) in housing walls 22 and 24 for the purpose of resisting the load applied to the housing by the tightening of a nut 192 at the end of first pawl bolt 190. Washers 212 and 214 are positioned at either end of the load sleeve 210. Thus it may be seen that pawl 194 is rotatable with respect to bolt 190 and is biased to engage ratchet gear 152. A second pawl 220 is positioned on a second pawl bolt 222 in association with a second pawl spring 224, pawl spacer 226, gear detent 228 and load sleeve 230 which was adapted to rotatably receive a sleeve portion 231 of a sleeve member 227 therethrough. Sleeve member 227 is in turn adapted to the rotatably received on bolt 222 and is also adapted to rotatably receive spacer sleeve 226 thereabout between detent 228 and pawl 239. A radially extending plate portion 229 of sleeve member 227 is adapted to abut housing wall 22 and to slidingly displaceably abut detent 228. The upper end of sleeve portion 231 abuttingly engages the head of nut 222 thus sleeve member 227 is held fixed relative bolt 222 by frictional forces at its abutment surfaces. Posts 233 and 235 provided at opposite ends of spacer sleeve 226 are adapted to fixedly engage detent 228 and second pawl 220 respectively as through bolts 237 and 239 therein. Thus detent 228 and second pawl 220 rotate with spacer sleeve 226 relative sleeve member 227 and bolt 222.

Figure 3:
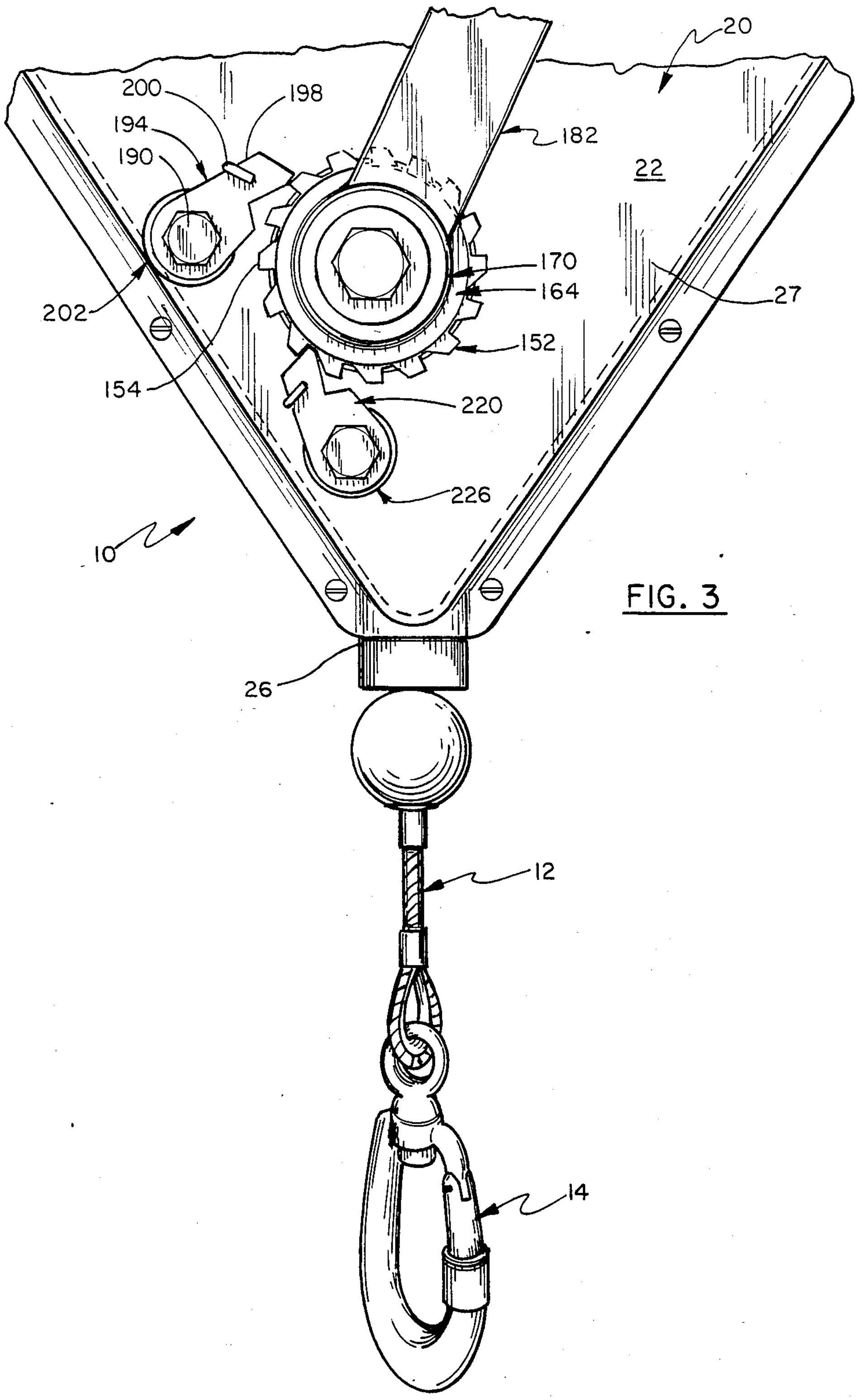
FIG. 3 is a side elevation view of a lower external portion of a fall arrester and emergency retrieval apparatus.

As illustrated by FIG. 3, the pawls 194, 220 are located in circumferentially spaced apart relationship at a distance whereby when one pawl is seated within ratchet gear 152, the other pawl is unseated. The pawl positioning is such that the first and second pawl engagement with ratchet gear 152 are symmetrically out of phase.

Figure 4:
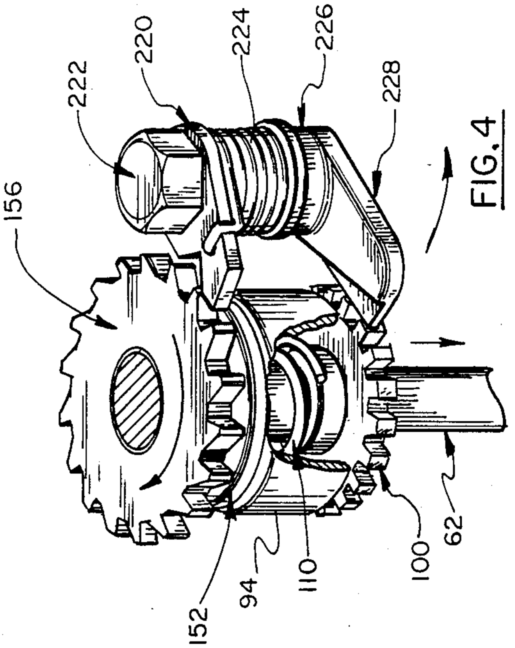
FIG. 4 is a detailed perspective view illustrating cooperation of a pawl and detent assembly with a ratchet gear.

Rotation of ratchet gear 152 from a position where second pawl 220 is initially engaged with gear 152, as shown in FIG. 3, causes second pawl 220 to be displaced radially outwardly, as shown by FIG. 4, causing simultaneous angular displacement of gear detent 228. The angular displacement of detent gear 228 causes it to be moved from covering engagement with housing cutout 97 to allow pinion gear 100 to be axially inwardly displaced by pinion gear actuator spring 110. Thus, pinion gear 100 is caused to be engaged with drum gear 48 by an initial rotation of ratchet gear 152. The initial rotation of ratchet gear 152 is caused by rotation of handle means 182 in a direction to cause threaded nut 170 to be threaded axially inwardly a sufficient amount to cause frictional engagement between member 130 and ratchet gear 152, as described in detail above.

Figure 8:
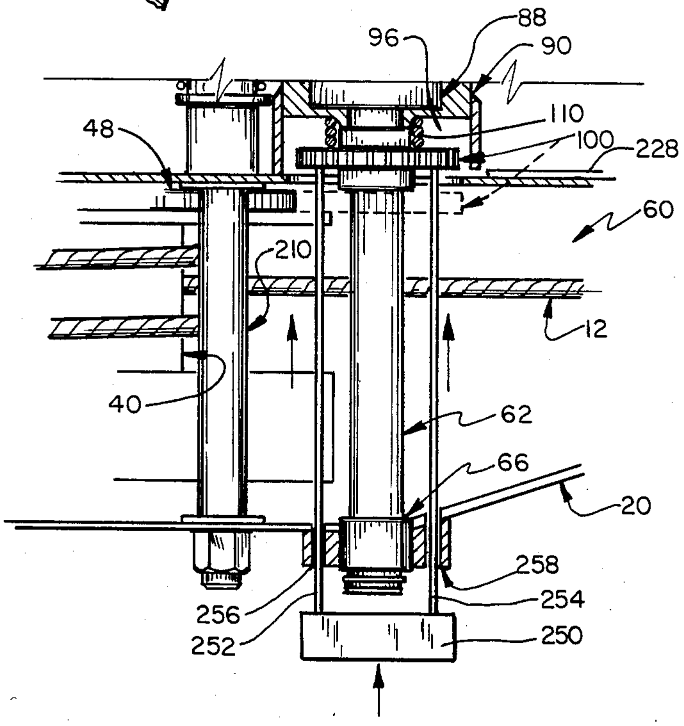
FIG. 8 is the same cross-sectional side elevation view of FIG. 2 illustrating resetting of the emergency retrieval assembly with a specially adapted tool.

It is a feature of the structural arrangement abovedescribed that once pinion gear 100 is actuated into meshing engagement with drum gear 48, it remains in this position until being reset by authorized personnel. Resetting may be accomplished, as shown in FIG. 8, by inserting a special tool such as an elongate prong member 250, preferably of a type having two prongs 252, 254, into associated holes 256, 258 in housing wall 24 immediately opposite pinion gear 100. Through the insertion of prongs 252, 254 into engaging contact with the inner face surface of pinion gear 100 it may be urged axially outwardly into space 96 and held there until gear detent means 228 is again positioned in covering relationship with housing cutout 97. Holes 256, 258 may be threaded to receive bolts or the like therein (not shown) which may be for example countersunk and covered with paint to prevent detection of the resetting holes 256 and 258 by unauthorized personnel. It may be seen that once gears 48 and 100 are engaged, the apparatus is unsuitable for use as a fall arrester since the fall arrester assembly feature such as the automatic spring loaded cable retraction and the braking and shock absorbing feature of the fall arrester assembly are overriden by the gear engagement invoked once the emergency retrieval assembly is activated. Thus, the device must be removed from use once the emergency retrieval assembly has been engaged. In this manner any fall arrester and emergency retrieval apparatus 10 which has been subject to use during which the emergency retrieval assembly was activated must be inspected by appropriate personnel and the unit be reset before returning it to usage. A means for anchoring the fall arrester and emergency retrieval apparatus 10 may comprise a tripod 270, FIGS. 9–12. In a preferred embodiment the tripod comprises a horizontally extending, generally triangular shaped plate 272 having truncated corner portions 274, 275 (only two shown). The plate also comprises a central, circular cutout portion 278 through which cable 12 may be received if the fall arrester housing 20 is anchored on a tripod leg, as discussed in further detail hereinafter. An upwardly extending cylindrical collar 280 is provided in circumscribing relationship with cutout 278 and includes two bores 281 therein (only one shown in FIG. 9) for receiving a housing anchor bolt 282. The anchor bolt may include a pin bore 283 in one end thereof and may have mounted thereon a bolt strap 284 secured to the horizontal plate 272 or another suitable location to prevent loss of the anchor bolt. A pin 286 mounted on a pin strap 288 which is secured to the horizontal plate or other suitable location to prevent loss of pin 286 may be received within pin bore 283 for securing bolt 282 in position within the collar bores 281. An upright pulley housing 290 is fixedly attached to the horizontal plate 272 and cylindrical collar 280 in a manner whereby cable 12 passing over a pulley 300 secured therein may pass into plate cutout 278 in non-touching contact with any fixed surface. The pulley housing may comprise two lateral side portions 292, 294, having central bores 296 for receiving a pulley shaft bolt 298 used to rotatably mount a conventional pulley 300 within the pulley housing. A pulley cover 302 may be provided having a first pivoting end 304 with a bore 305 therein which may be aligned with bores 307 (only one shown) in connecting ears 308 of the pulley housing allowing the pulley cover to be pivotally attached thereto as by pin 306. The pulley cover may comprise a second locking end 310 having a bore 311 therein adapted to be aligned with bores 316 and locking ears 314 and secured thereto as by pin 312. Thus, cable 12 may be threaded onto pulley 300 when pulley cover 302 is pivotally opened and the cable 12 may be secured in position on the pulley by thereafter rotating the pulley cover into the locked position and inserting pin 312 through associated bores 311 and 316.

Two opposite downwardly projecting arcuate stabilizers 320, 322 may be fixedly mounted as by welding or the like to plate 272 in concentric relationship with plate cutout 278. The stabilizers 320, 322 hold the fall arrester housing 20 in a relatively fixed position when the housing is suspended from the tripod by anchor bolt 282 as shown by FIG. 11. The construction and arrangement of the tripod and the stabilizer plates are such that the arcuate curvature of the stabilizers accept the peripheral wall portions 29, 30 of the housing unit 20 therewithin. Three identical fixed leg supports 326, 328 (only two shown) are fixedly attached at each corner of tripod means 270 as by welding or the like. Each fixed leg support comprises three side faces 330, 331, 332 and one inwardly positioned opened face 333, FIG. 9. In a preferred embodiment the fixed leg support sides have a square cross-sectional shape for accepting legs having a square cross-sectional shape. Each of the outer side faces 331 comprise an upper cutout portion 335 (defining on upper face portion 331A) which facilitates a downward and outwardly pivoting movement of the top portion of an associated leg as described in further detail hereinafter.

Figure 9:
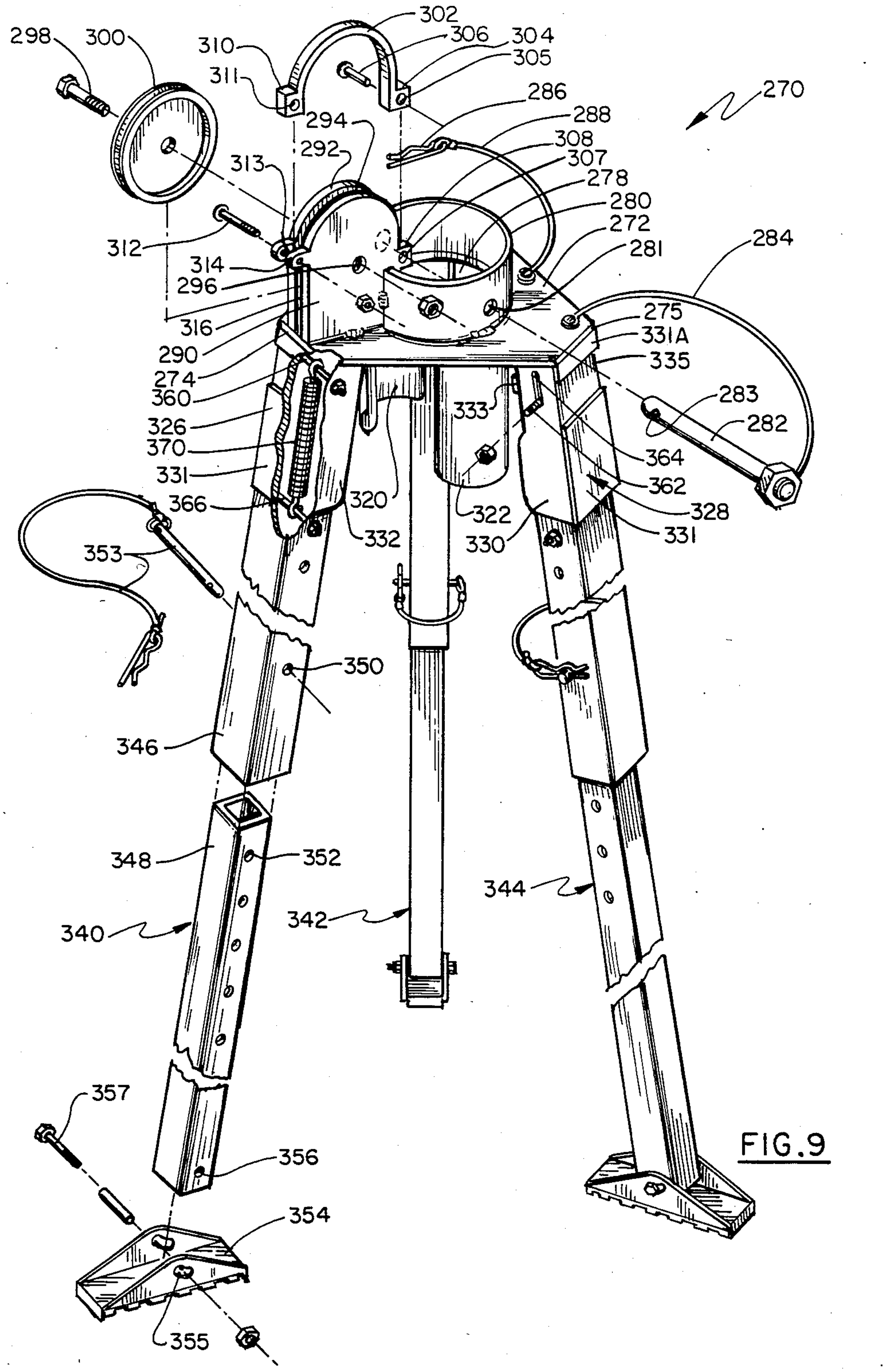
FIG. 9 is a partially cut-away, partially exploded perspective view of a tripod apparatus for supporting a fall arrester and emergency retrieval apparatus.

As illustrated by FIG. 9, tripod 270 is provided with three tripod legs 340, 342, 344, each having an upper leg 346 which is preferably formed from a square high-strength tubular metal and a lower leg 348 preferably formed from a square high-strength tubular metal and adapted to be accepted within the upper leg 346. The upper leg and lower leg are each provided with a plurality of holes 350, 352 therealong which are adapted to be adjustably positioned opposite one another and secured in this position as by pin assembly 353 whereby the legs are adjustable in length. A pivotal foot 354 of a conventional foot ladder construction may comprise slotted holes 355 therein coaxially positionable with lower leg hole 356 and secureable to the lower leg as by pin assembly 357. Thus, the tripod is provided with three adjustable length legs having pivotal gripping foot portions. The upper portion of each upper leg is pivotally secured to an associated fixed leg support 326, 328, etc. by a leg pivotal attachment bolt 360, FIG. 9, which is received within opposite circular bores 362 in the fixed leg support and through opposite downwardly extending slots 364 positioned at the upper portion of each upper leg. Thus, each upper leg is pivotal about bolt 360 and is also linearly displaceable relative the bolt along the length of slots 364. When the upper leg is positioned upwardly relative the bolt 360, it is prevented from pivoting inwardly about the bolt by the interference of adjacent outward upper portion 331A. However, when the leg is positioned downwardly relative bolt 360, it may be pivoted inwardly with the top thereof moving outwardly in clearing relationship with outer leg support face portion 331 because of the cutout 335 provided therein. In order to prevent a leg from inadvertantly dropping downwardly and pivoting inwardly, each leg is biased in the up position as by coil spring 370 mounted at one end on bolt 360 and mounted at the other end to a bolt 366 provided in a lower portion of each upper leg. Thus, it will be seen that the tripod legs may be pivoted between an inward position and an outward position. The amount of travel in the outward position is limited by the enclosing fixed leg supports 326, 328, etc. and once a tripod leg is in the outwardmost position, it is locked therein by a biasing means. Before the leg may again be positioned inwardly, it must first be pulled downwardly with a force dependent upon the strength of the biasing means.

Figure 12:
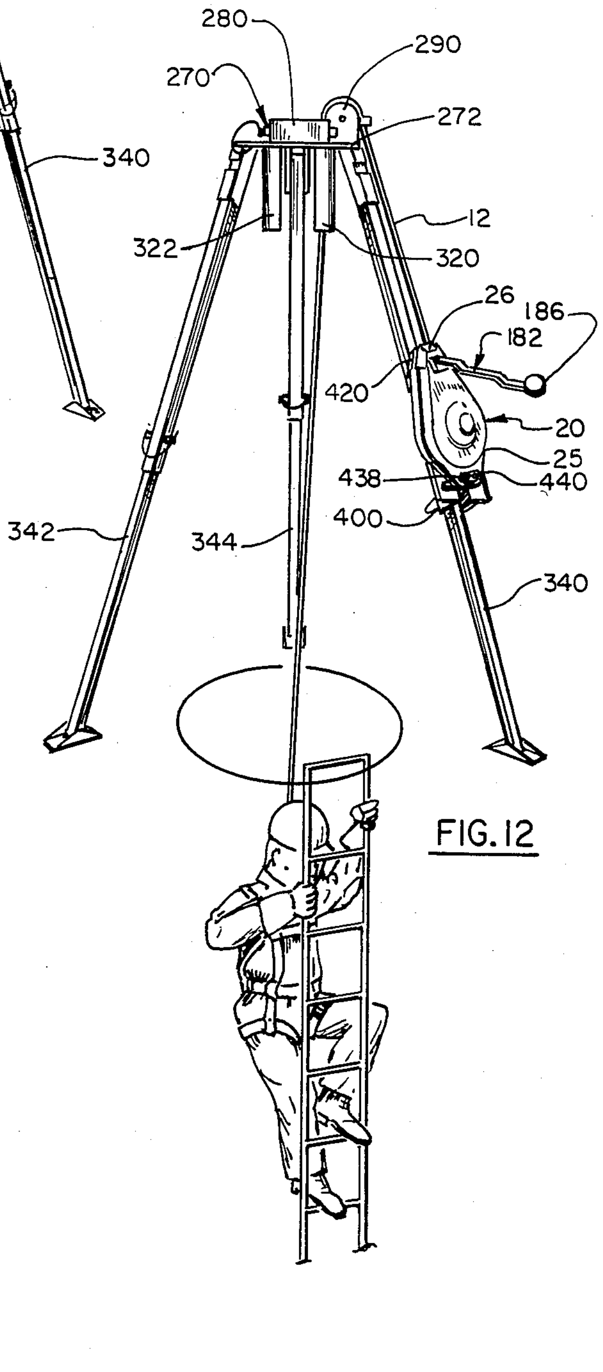
FIG. 12 is a schematic illustration of a fall arrester and emergency retrieval apparatus mounted on a bracket supported on a leg portion of a tripod apparatus being used by a worker while ascending or descending a ladder.

In one arrangement, shown in FIG. 11, the fall arrester housing 20 is mounted in a downwardly extending relationship from a central portion of the tripod as by pinning of the handle portion of the housing with bolt 282. The housing 20 may be provided with a folding handle 399 to facilitate stabilizing the apparatus 10 during operation of handle 182. In another embodiment, as shown in FIG. 12, a bracket means 400 is fixedly attached to tripod leg 340 positioned immediately below the pulley assembly 290, 300. The bracket means 400 fixedly, removably accepts the fall arrester housing 20 therewithin at an orientation whereby the cable accepting end of the housing 20 is directed upwardly towards the pulley 300 and in which the handle means 182 or other drive means portion of the emergency retrieval assembly 60 is positioned outwardly to allow a person standing next to the tripod to conveniently operate the handle means 182.

Figure 10:
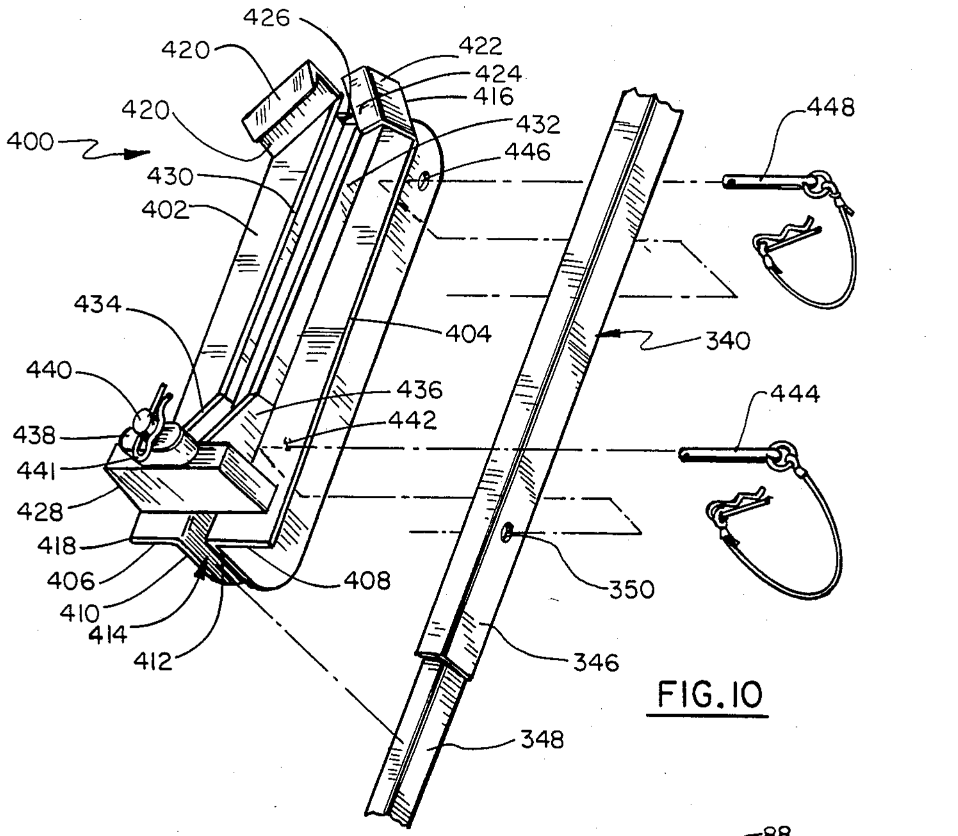
FIG. 10 is an exploded perspective view illustrating the mounting of a tripod bracket on a tripod leg.

As illustrated by FIG. 10, bracket means 400 may comprise two longitudinally extending, L-shaped members 402, 404 having laterally extending plate portions 406, 408 and inwardly extending plate portions 410, 412, respectively. A gap 414 is provided between opposite surfaces of the inwardly extending portions 410 for receiving an upper portion 346 of leg 340 therewithin in close fitting relationship. Gap 414 extends unrestricted from the forward end 416 to the rear end 418 of the bracket means. A forward receiving means for preventing forward movement of the housing means 20 relative the bracket means 400 may comprise two outwardly projecting legs 420, 422 fixedly attached as by welding or the like to forward ends of longitudinal member laterally extending portions 406, 408. Each outwardly projecting plate 420, 422 may in turn be fixedly attached to rearwardly projecting flange plates 424, 426 designed to prevent outward movement of the housing 20 once it is received therein. A forward transverse connecting member 426 may be weldingly attached between laterally extending portions 406, 408 at a forward position thereon and a rear transverse connecting block 428 may be fixedly attached to laterally extending portions 406, 408 at a rearward position thereon, thus holding the L-shaped members 402, 404 in fixed parallel relationship. Longitudinally extending riser plates 430, 432 extending from the forward end of the bracket to the rear transverse connecting block 428 may be weldingly attached to laterally extending portions 406, 408 respectively for the purpose of supporting one face wall 24 of fall arrester housing 20 thereon. The riser plates may comprise rearwardly outwardly tapering riser portions 434, 436 respectively, which abuttingly engage block 428. A handle receiving means such as outwardly projecting lower post 438 may be provided at an outwardly positioned surface of block 428 to receive connector end 25. An upper post 440 adapted to accept retainer pin 441 may be provided to prevent displacement of the housing means 20 after it is received within the bracket 400. Means for attaching the bracket to leg 340 may comprise a rearwardly positioned opposite pair of bores 442, (only one shown) which are alignable with leg bores 350 and adapted to receive a pin assembly 444 therethrough for holding the bracket in linearly fixed relationship with the tripod leg 340. The bracket attachment means may further comprise forwardly positioned bores 446 (only one shown) adapted to receive pin assembly 448 therethrough which are positioned such that pin 448 is located just inwardly of leg 340 to thereby prevent outward displacement of the bracket means 400 relative tripod leg 340. The bracket may be constructed from a high strength metal and may be coated with a non-abrasive agent such as plastic or the like.

Thus, it may be seen that a bracket means 400 is provided which is capable of securely anchoring housing 20 therein in a manner which allows free operation of the emergency retrieval assembly 60. The bracket means 400 is also adapted to be securely affixed to tripod leg 340 in a manner which allows quick and easy attachment or removal of the bracket from the leg.

Figure 15:
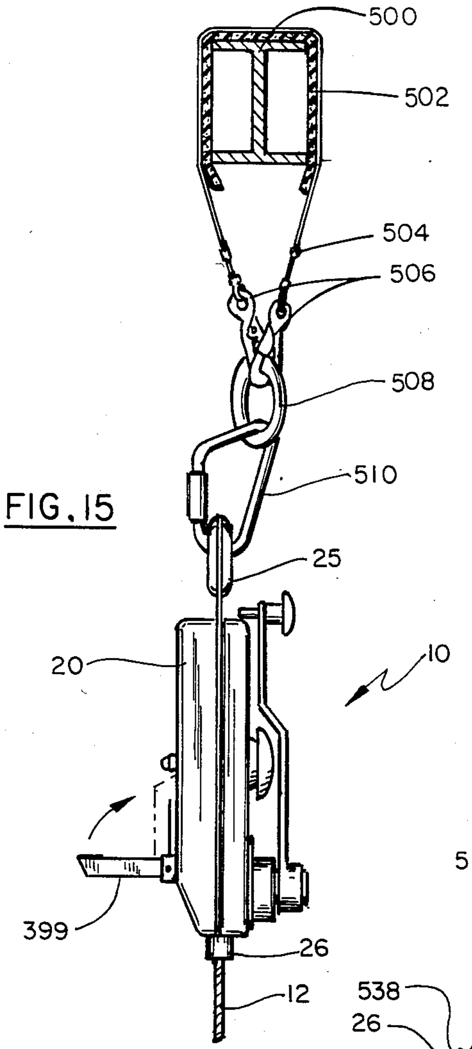
FIG. 15 is a partially cross-sectional and elevation view illustrating anchorage of the fall arrester and emergency retrieval apparatus on an I-beam.

As illustrated by FIG. 15, the fall arrester and emergency retrieval apparatus 10 of the present invention may be anchored to an I-beam 500 as by use of a flexible pad 502 wrapped around the I-beam to prevent abrasion and an installation cable assembly 504 having snap hooks 506 mounted at the end thereof, and engaging a ring 508. The ring 508 may in turn receive an installation snap hook 510 therewithin, which in turn receives the housing connector 25 therewithin. FIG. 15 also illustrates that a support handle 399 used to stabilize the fall arrester and emergency retrieval apparatus 10 may be foldable into parallel alignment with the housing 20 when not in use.

Figure 16:
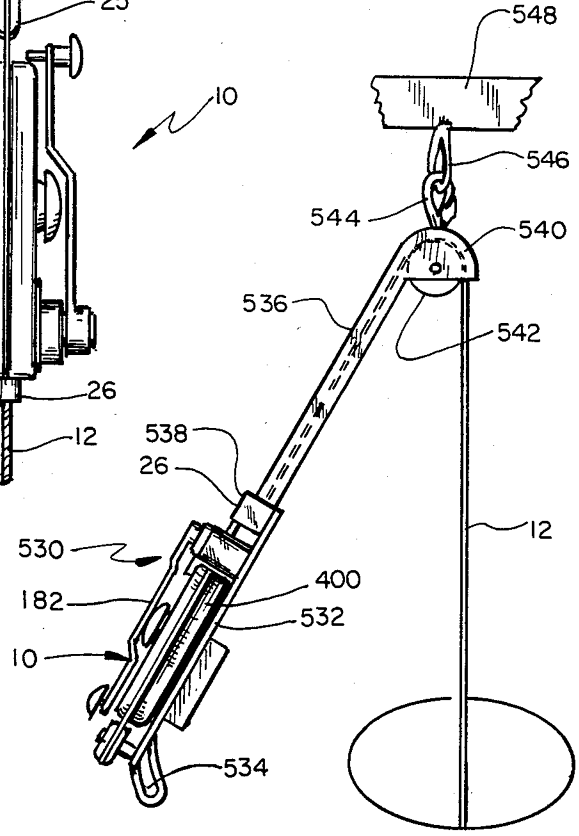
FIG. 16 is an elevation view of a fall arrester and emergency retrieval apparatus mounted on a portable mounting assembly.

A portable and suspendible fall arrester and emergency retrieval apparatus mounting assembly 530 may be provided enabling quick attachment and removal of the apparatus to overhead anchorage 548. The assembly 530 comprises a receiving bracket 400 which may be of identical configuration to the receiving bracket illustrated in FIG. 10. The bracket 400 in turn receives a bracket attachment plate 532 at its lower surface which may be fixedly attached to bracket 400 by bolts, weldement or other conventional attachment means. The bracket attachment plate 530 in turn comprises a lower end handle 534 which is graspable to facilitate movement of the assembly 530 and also to stabilize the assembly 530 when the emergency retrieval assembly handle 182 is being used. The mounting assembly 530 further comprises an extension tube 536 attached to the cable receiving end 26 of the apparatus 10 as by a coupling 538. Extension tube 536 in turn has a pulley sheath 540 fixedly mounted at the distal end thereof. A pulley 542 is rotatably mounted within the pulley sheath and a sheath hook 544 is attached to an upper end of the sheath 540 as by weldement or the like. The sheath hook 544 may be a snap hook which is attachable to anchorage structure such as anchor ring 546 fixedly mounted on support beam 548. Cable 12, from the fall arrester and emergency retrieval apparatus 10, may be extended through the extension tube 536 and over the top of pulley 542 to enable use of the apparatus 10 in the attitude illustrated in FIG. 16. It is a feature of the present invention that the apparatus 10 may be positioned at any attitude with respect to gravity and is fully operational in any such attitude if provided with appropriate support structure.

Figure 17:
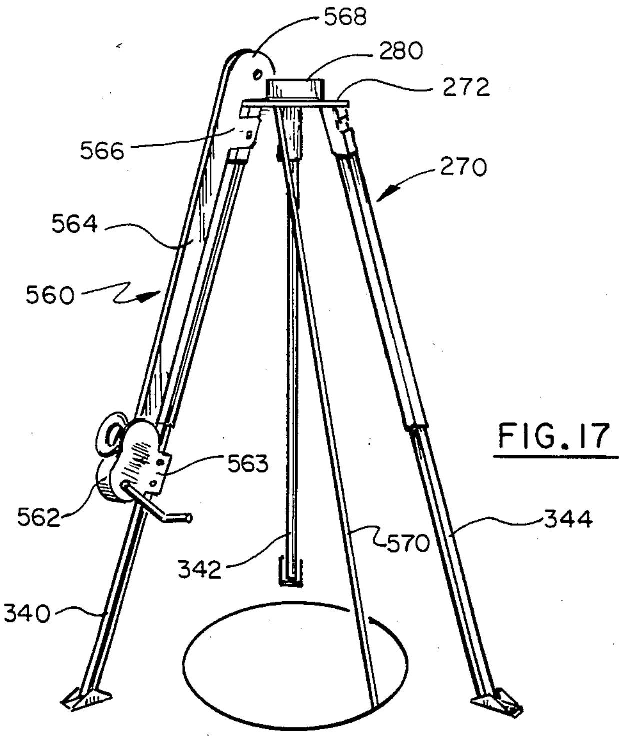
FIG. 17 is a perspective view of a tripod apparatus used to support an attached winch assembly.

As illustrated by FIG. 17, the tripod 270 illustrated in FIG. 9, is adapted to receive other apparatus thereon, such as a winch assembly 560 comprising a hand winch unit 562 pinned to a lower portion of one tripod leg 340 at a bracket portion 563 thereof. A tubular extension 564 may be mounted at one end of the hand winch 562 and is fixedly mounted to leg 340 as by tubular extension bracket 566 and associated pins and by abutting contact of pulley sheath 568 with the tripod central horizontal plate 272. The pulley sheath 566 is fixedly attached at the distal end of extension tube 564 and supports a pulley (not shown) therewithin. A winch cable 570 extends through extension tube 564 and over pulley housed by sheath 568 and passes through the central opening in tripod horizontal plate 272.

Figure 18:
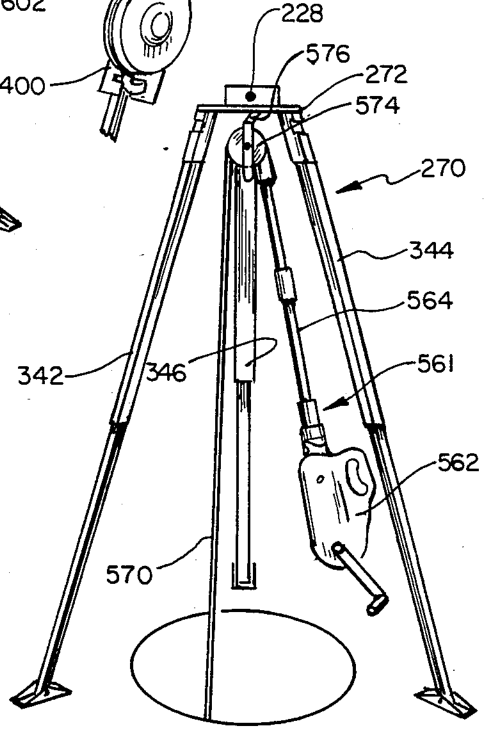
FIG. 18 is a perspective view of a tripod apparatus used to support a portable winch assembly.

In another slightly different embodiment of the invention, as illustrated by FIG. 18, a portable hand winch assembly 561 is provided having hand winch unit 562, tubular extension 564, pulley sheath 574 and pulley sheath hook 576 pivotally mounted on pulley sheath 574. The hook portion 576 of this device is mountable on tripod 10, 228.

Figure 19:
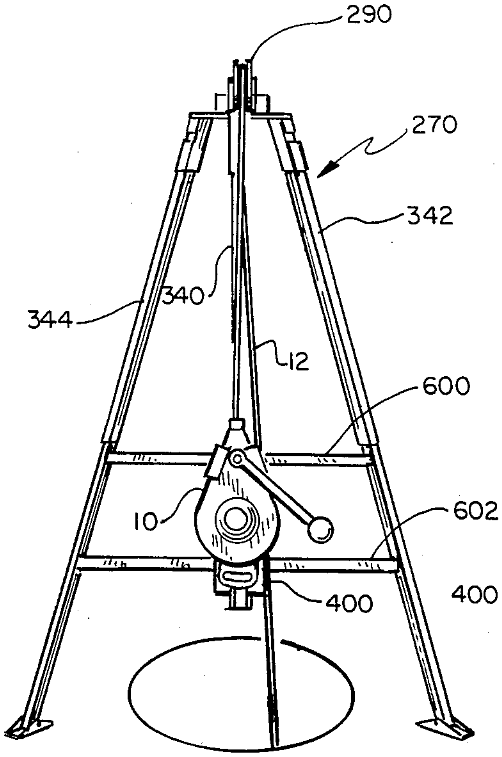
FIG. 19 is a perspective view of a tripod apparatus with brace members used to support a fall arrester and emergency retrieval apparatus.

In a modified version of the tripod, as shown by FIG. 19, horizontally extending brace members 600, 602 are provided in fixed engagement with legs 342, 344 as by clamping or other conventional attachment means. Thereafter, bracket 400 may be fixedly attached to members 600, 602 by conventional attachment means. In this modified version, pulley housing 290 is provided at a position opposite leg 340.

Figure 21:
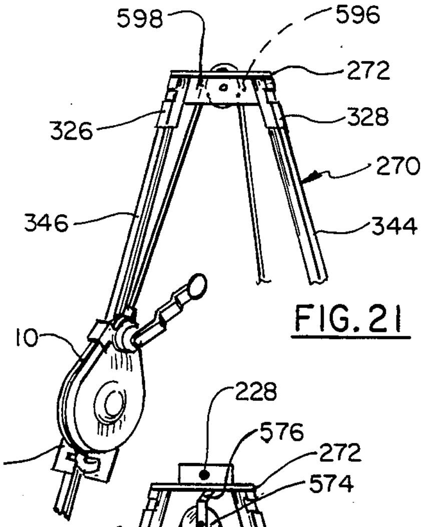
FIG. 21 is a perspective view of a portion of a tripod apparatus used to anchor a fall arrester and emergency retrieval apparatus.
Figure 20:
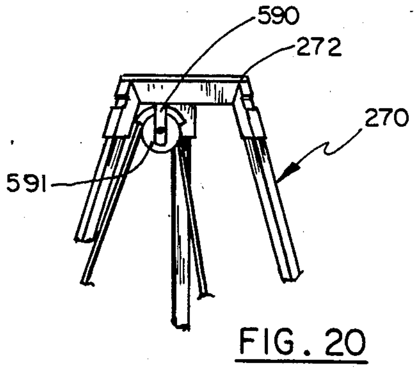
FIG. 20 is a detail perspective view of an upper portion of a tripod apparatus.

In yet another embodiment of the tripod 270 shown in FIG. 20, a pulley sheath 590 is attached to a lower portion of plate 272 enabling an associated pulley 591 to be attached below plate 272. In the embodiment shown in FIG. 21, downwardly extending plates 598 are fixedly attached about the periphery of plate 272 and fixed leg supports 326, 328, etc. Pulley 596 is mounted within the enclosure formed by plates 598, etc. As also illustrated by FIG. 21, bracket means 400 may be mounted in flush relationship with a side portion of one of the tripod legs 346 rather than an outwardly positioned surface thereof.

It is contemplated that the inventive concepts herein described may be variously otherwise embodied and it is intended that the appended claims be construed to include alternative embodiments of the invention except insofar as limited by the prior art.

What is claimed is:

1. A fall arrester and retrieval apparatus comprising:

a. speed sensitive drum means rotatable about a central axis of rotation in a first direction associated with line means extension and a second direction associated with line means retraction, said drum means being biased in said second direction by a biasing torque to prevent slack in associated line means; said drum means being substantially free rotating in said second direction except for said biasing torque; said drum means being substantially free rotating in said first direction except for said biasing torque, up to a predetermined speed; said drum means being adapted to gradually brakingly halt rotation in said first direction at said predetermined rotational speed and being adapted to lock in a non-rotating position subsequent to said braking so long as an externally applied torque in said first direction of rotation is applied to said drum means and so long as said externally applied torque does not exceed a predetermined override value and being adapted to unlock and return to said free rotating state when said externally applied torque in said first direction is removed;

b. line means operably attached at a first end thereof to said drum means for being windingly retracted and unwindingly extended therefrom, said line means being operably attachable at a second end thereof to a worker's safety harness;

c. housing means for rotatably mounting said drum means therein, said housing means being operably attachable to an anchorage;

d. gear means selectively positionable in a disengaged operating mode in disengaged relationship with said drum means and an engaged operating mode in engagement with said drum means for turning and being turned by said drum means when in said engaged operating mode;

e. shaft means, having a longitudinal shaft axis, operably associated with said gear means for turning and being turned by said gear means during said engaged operating mode in a first shaft rotation direction associated with said first direction of rotation of said drum means associated with line means extension and a second shaft rotation direction associated with said second direction of rotation of said drum means associated with line means retraction;

f. drive means operably associated with said shaft means for turning said shaft means and for selectively tightening and loosening a clutch means, said drive means being rotatable in a first drive means direction associated with line means extension and a second drive means direction associated with line means retraction;

g. clutch means operably associated with said shaft means and said drive means for use during said gear means engaged operating mode for selectively causing rotational engagement and disengagement of said drive means with said shaft means wherein rotation of said drive means in said first drive means direction associated with line means extension causes adjustable clutching disengagement of said drive means and said shaft means allowing rotation of said shaft means in said first shaft means direction associated with line means extension in response to a load on said line means, and wherein rotation of said shaft means in said first shaft means direction with said drive means in an immobilized position produces clutching engagement of said shaft means and said drive means whereby rotation of said shaft means is brakingly halted, and wherein initial rotation of said drive means in said second drive means direction associated with line means retraction causes adjustable clutching engagement of said drive means and said shaft means and wherein rotation of said drive means in said second drive means direction subsequent to said clutching engagement causes rotation of said shaft means in said shaft means second direction associated with line means retraction;

h. whereby said fall arrester and retrieval apparatus is operational in a fall arrester state associated with said gear means disengaged operating mode, for arresting the fall of a worker attached to said line means, and whereby said fall arrester and retrieval apparatus is operational in an emergency retrieval state associated with said gear means engaged operating mode, for raising or lowering a worker to a selected position subsequent to a fall by rotation of said drive means in said second drive means direction to retract the line means to raise the worker and by rotation of said drive means in said second drive means direction to remove the torque load on said drum means to release the locking mechanism of said drum means and to subsequently permit lowering of the worker by rotation of said drive means in said first drive means direction to cause said clutch means to adjustably disengage said drive means and said shaft means to allow controlled descent of the worker by controlled rotation of said drum means in said first drum means direction.

2. The invention of claim 1 wherein said longitudinal axis of said shaft means is positioned in parallel alignment with said central axis of rotation of said drum means and wherein said shaft means is rotatably mounted in said housing means.

3. The invention of claim 2 wherein said shaft means comprises an elongate shaft member having a first end and a second end, said shaft member being received through opposite openings in opposite first and second walls of said housing means said first end of said shaft means being received within a sleeve positioned immediately axially outwardly of said second housing wall said shaft member having an annular shaft bearing fixedly mounted thereon at a position proximate said second end and located axially outwardly of said first housing wall, said annular shaft bearing being rotatably supported within a bearing housing fixedly attached to said housing means whereby said shaft member is rotatable about said shaft axis and is radially and axially fixed relative said housing means.

4. The invention of claim 2 wherein said gear means comprises a pinion gear operably mounted on said shaft means and a drum gear operably mounted on said drum means, said pinion gear being selectively positively engagable and disengageable with said drum gear.

5. The invention of claim 4 said pinion gear being rotatably fixed relative said shaft means and being axially movable along said shaft means between a position in engaged relationship with said drum gear and a position in disengaged relationship with said drum gear.

6. The invention of claim 5 wherein said pinion gear is biased toward said position in engaged relationship with said drum gear.

7. The invention of claim 6 wherein said pinion gear is retainable in said position in disengaged relationship with said drum gear by a radially displaceable detent plate.

8. The invention of claim 7 wherein said radially displaceable detent plate is actuated by rotation of said drive means.

9. The invention of claim 6, 7 or 8 further comprising stop means for stopping the axial displacement of said pinion gear by said biasing means at said position thereof in engaging contact with said drum gear.

10. The invention of claim 8 further comprising stop means for stopping the axial displacement of said pinion gear by said biasing means at said first position in engaging contact with said drum gear wherein said stop means comprises a radially extending flange portion of said drum means.

11. The invention of claim 8 further comprising stop means for stopping the axial displacement of said pinion gear by said biasing means at said first position in engaging contact with said drum gear wherein said stop means comprises a radially extending abutment surface fixedly attached to said shaft means.

12. The invention of claim 2 wherein said clutch means comprises:

radially extending plate means for resisting an axial load, mounted in rotationally and axially fixed relationship with said shaft means in annular relationship therewith;

ratchet gear means, said ratchet gear means being engaged for clutching engagement with said plate means mounted in annular relationship with said shaft means at a position axially outward of said plate means in rotationally and axially displaceable relationship with said shaft means and said plate means, by pawl means for preventing rotation of said ratchet gear means in said first shaft direction of rotation associated with line means extension;

axial load applying means for applying and removing a selectable axial load against said ratchet gear means for variably adjustably moving said ratchet gear means into and out of engagement with said plate means.

13. The invention of claim 12 wherein said axial load applying means comprises threaded nut means for axial displacement relative said shaft means by screwing rotation of said nut means about said shaft means axis.

14. The invention of claim 13 wherein said threaded nut means is operatively attached to said drive means and screwingly rotatable thereby.

15. The invention of claim 13 wherein said pawl means comprises a first pawl and a second pawl adapted to engage said ratchet gear in alternating sequence, each pawl being arcuately deflectable about an associated axis of rotation between a first inwardly positioned orientation in engagement with said ratchet gear means and a second outwardly deflected orientation in disengaged relationship with said ratchet gear means.

16. The invention of claim 15 wherein each of said pawls is biased in said first inwardly oriented position in engagement with said ratchet gear means.

17. The invention of claim 16 wherein said second pawl is operably associated with detent means for actuating said gear means.

18. The invention of claim 17 wherein said second pawl is mounted in rotatably fixed relationship on a second pawl shaft having a central shaft axis of rotation and wherein said detent means is mounted in rotatably fixed relationship on said second pawl shaft, whereby an arcuate deflection of said second pawl about said second pawl shaft axis of rotation produces a simultaneous and corresponding arcuate deflection of said detent means, whereby said detent means is deflectable to actuate said gear means from said disengaged operating mode to said engaged operating mode by rotation of said drive means in said drive means second direction of rotation associated with line means retraction.

19. The invention of claim 14 further comprising first clutch pad means positioned between said nut means and said ratchet gear means and second clutch pad means positioned between said ratchet gear means and said radially extending plate means for transmitting force causing friction and for absorbing shocks.

20. The invention of claim 19 wherein said radially extending plate means is integrally formed with an axially extending sleeve adapted to threadingly accept said nut means thereabout.

21. The invention of claim 1 further comprising tripod means for anchoring said housing means above a confined entry comprising:

central frame means for attachemnt of tripod leg means;

tripod leg means operably attached to said central frame means for stablely supporting said frame means above a base surface;

housing receiving means for removably fixedly anchoring said housing means.

22. The invention of claim 21, said housing receiving means comprising:

pin means removal by mountable on said central frame means for suspending said housing means therefrom, and stabilizer means extending downwardly from said central frame means for engaging a peripheral portion of said housing means for preventing rotational movement thereof.

23. The invention of claim 21 wherein said housing receiving means comprises:

leg bracket means mountable on said tripod leg means for receiving said housing means therein; and further comprising pulley means operably mounted on said tripod means above said bracket means for rotatably supporting said line means thereon.

24. The invention of claim 21, 22 or 23, said tripod leg means comprising three adjustable length legs each leg being pivotally mounted on said central frame means and pivotable between an inward position and a locked outward position.

25. A fall arrester and emergency retrieval apparatus comprising:

a. speed sensitive drum means rotatable about a central axis of rotation in a first direction and a second direction, said drum means being biased in said second direction to prevent slack in associated line means, said drum means being adapted to gradually brakingly halt rotation in said first direction at a predetermined rotational speed and being adapted to lock in a non-rotating position subsequent to said braking so long as an externally applied torque in said first direction of rotation is applied to said drum means and being adapted to unlock and allow rotation when said externally applied torque in said first direction is removed;

b. line means operably attached at a first end thereof to said drum means for being windingly retracted and unwindingly extended therefrom, said line means being operably attachable at a second end thereof to a worker's safety harness;

c. housing means for rotatably mounting said drum means therein, said housing means being operably attachable to a fixed support structure;

d. gear means selectively positionable in a first operating mode in disengaged relationship with said drum means and a second operating mode in engagement with said drum means for turning said drum means in said second drum means direction of rotation and for being turned by said drum means during rotation of said drum means in said first drum means direction of rotation; said gear means comprising a pinion gear operably mounted on said shaft means and a drum gear operably mounted on said drum means, said pinion gear being selectively positively engageable and disengageable with said drum gear; said pinion gear being rotatably fixed relative said shaft means and being axially movable along said shaft means between a first position in engaged relationship with said drum gear and a second position in disengaged relationship with said drum gear; said pinion gear being biased toward said first position in engaged relationship with said drum gear; said pinion gear being retainable in said second position by a radially displaceable detent plate; wherein stop means are provided for stopping the axial displacement of said pinion gear by said biasing means at said first position in engaging contact with said drum gear; said stop means comprising a radially extending flange portion of said drum means;

e. shaft means, having a longitudinal shaft axis, operably associated with said gear means for turning and being turned by said gear means in a first shaft rotation direction associated with said first direction of rotation of said drum means and a second shaft rotation direction associated with said second direction of rotation of said drum means; said longitudinal axis of said shaft means being positioned in parallel alignment with said central axis of rotation of said drum means and wherein said shaft means is rotatably mounted in said housing means; said shaft means comprising an elongate shaft member having a first end and a second end, said shaft member being received through opposite openings in opposite first and second walls of said housing means said first end of said shaft members being received within a sleeve affixed to said second housing wall, said shaft member having an annular shaft bearing fixedly mounted thereon at a position proximate said second end and located axially outwardly of said first housing wall, said annular shaft bearing being rotatably supported within a bearing housing fixedly attached to said housing means whereby said shaft member is rotatable about said shaft axis and is radially and axially fixed relative said housing means;

f. drive means operably associated with said shaft means for turning said shaft means in said second direction associated with said second direction of rotation of said drum means and for selectively tightening and loosening a clutch means;

g. clutch means operably associated with said shaft means and said drive means for selectively causing rotational engagement and disengagement of said drive means with said shaft means wherein rotation of said drive means in said first direction causes adjustable clutching disengagement of said drive means and said shaft means allowing rotation of said shaft means in said first direction in response to a load on said line means, and wherein rotation of said shaft means in said first direction with said drive means in an immobilized position produces clutchingly engagement of said shaft means and said drive means whereby rotation of said shaft means is brakingly halted, and wherein initial rotation of said drive means in said second direction causes adjustable clutching engagement of said drive means and said shaft means and wherein rotation of said drive means in said second direction subsequent to said clutching engagement causes rotation of said shaft means in said shaft means second direction; wherein said clutch means comprises:

said radially extending plate means being integrally formed with an axially extending sleeve adapted to threadingly accept a nut means thereabout;

ratchet gear means, said ratchet gear means being engaged for clutching engagement with said plate means mounted in annular relationship with said shaft means at a position axially outward of said plate means in rotationally and axially displaceable relationship with said shaft means and said plate means, by pawl means for preventing rotation of said ratchet gear means in said first shaft direction of rotation; radially extending plate means for resisting an axial load, mounted in rotationally and axially fixed relationship with said shaft means in annular relationship therewith; wherein said pawl means comprises a first pawl and a second pawl adapted to engage said ratchet wheel in alternating sequence, each pawl being arcuately deflectable about an associated axis of rotation between a first inwardly positioned orientation in engagement with said ratchet gear means and a second outwardly deflected orientation in disengaged relationship with said ratchet gear means, each of said pawls being biased in said first inwardly oriented position in engagement with said ratchet gear means, said second pawl being operably associated with said detent means for actuating said gear means, said second pawl being mounted in rotatably fixed relationship on a second pawl shaft having a central shaft axis of rotation and said detent means being mounted in rotatably fixed relationship on said second pawl shaft, whereby an arcuate deflection of said second pawl about said second pawl shaft axis of rotation produces a simultaneous and corresponding arcuate deflection of said detent means, whereby said detent means is deflectable to actuate said gear means from said first operating mode to said second operating mode in engagement with said drum means by rotation of said drive means in said shaft second direction of rotation;

axial load applying means for applying and removing a selectable axial load against said ratchet gear means for variably adjustably moving said ratchet gear means into and out of engagement with said plate means, said axial load applying means comprises threaded nut means for axial displacement relative said shaft means by screwing rotation of said nut means about said shaft means axis, said threaded nut means being operatively attached to said drive means and screwingly rotatable thereby;

first clutch pad means positioned between said nut means and said ratchet gear means and second clutch pad means positioned between said ratchet gear means and said radially extending plate means for transmitting friction and absorbing shocks;

h. whereby said fall arrester and retrieval apparatus is stablely mountable on said tripod means and is operational in a first state, wherein said gear means is disengaged from said drum means, for arresting the fall of a worker attached to said line means, and whereby said fall arrester and retrieval apparatus is operational in a second state, wherein said gear means is engaged with said drum means, for raising or lowering a worker to a selected position subsequent to a fall by rotation of said drive means in said second direction to wind in the line means to raise the worker and by rotation of said drive means in said second direction to remove the torque load on said cable drum to release the locking mechanism of said cable drum and to subsequently permit lowering of the worker by rotation of said drive means in said first direction to cause said clutch means to adjustably disengage said drive means and said shaft means to allow controlled descent of the worker by controlled rotation of said drum means in said first direction.

26. The invention of claim 25 further comprising:

tripod means for supporting said housing means above a confined entry comprising:

central frame means for attachemnt of tripod leg means;

tripod leg means operably attached to said central frame means for stablely supporting said frame means above a base surface, said tripod leg means comprising three adjustable length legs each leg being pivotally mounted on said central frame means and pivotable between an inward position and a locked outward position;

housing receiving means for removably fixedly supporting said housing means comprising pin means removal by mountable on said central frame means for suspending said housing means therefrom, and stabilizer means extending downwardly from said central frame means for engaging a peripheral portion of said housing means for preventing rotational movement thereof when mounted on said pin means, and said housing receiving means further comprising leg bracket means mountable on said tripod leg means for receiving said housing means therein; and pulley means operably mounted on said tripod means above said bracket means for rotatably supporting said line means thereon.

27. A method of retrieving a person suspended from a cable which is windingly attached to a fall arrester of the type having a clutch-brake cable drum of the type designed to freely rotate in a cable winding direction and designed to permit rotation in a cable unwinding direction up to a predetermined rotational speed in a first mode of operation; and designed to clutchingly halt the unwinding of the cable from the drum after said predetermined rotational speed is exceeded in a second mode of operation; and designed to be locked to prevent further rotation of the drum in the cable unwinding direction subsequent to said halting of cable unwinding, so long as an external cable unwinding load is applied to the cable, in a third mode of operation; and designed to return from said third mode of operation to said first mode of operation when said cable unwinding load is removed; the method comprising the steps of:

a. positively engaging the cable drum with rotatable gears when the drum is in the locked condition of said third mode of operation;

b. clutchingly engaging the rotatable gears by rotation of a rotatable drive designed to clutchingly engage the rotatable gears when rotated in a second direction and designed to clutchingly disengage the gears when rotated in a first direction;

c. rotating the drive means in the second direction subsequent to engaging the gears to retractably wind the cable to raise the person attached thereto to a predetermined position and to return said clutch-brake cable drum to said first mode of operation.

28. The invention of claim 27 comprising the further steps after step (c) of:

d. rotating the drive means in the first direction a selected amount to adjustably disengage the gears from the drive means to allow slipping rotation of the gears relative the drive means and to allow unwinding of the cable through rotation of the drum with the gears; and e. retaining the drive means in a rotatably stationary position until rotation of the gears caused by rotation of the drum in a direction of cable unwinding causes clutchingly braking engagement between the drive means and the gears thereby stopping rotation of the drum.

29. A fall arrester and retrieval apparatus comprising:

a. speed sensitive drum means rotatable about a central axis of rotation in a first direction associated with line means extension and a second direction associated with line means retraction, said drum means being biased in said second direction by a biasing torque to prevent slack in associated line means; said drum means being substantially free rotating in said second direction except for said biasing torque; and said drum means being substantially free rotating in said first direction except for said biasing torque, up to a predetermined speed in a drum means free-rotating state; said drum means being adapted to gradually brakingly halt rotation in said first direction at said predetermined rotational speed in a drum means braking state; and said drum means being adapted to lock in a non-rotating position subsequent to said braking so long as an externally applied torque in said first direction of rotation is applied to said drum means and so long as said externally applied torque does not exceed a predetermined override value in a drum means locking state; and said drum means being adapted to unlock and return to said free rotating state when said externally applied torque in said first direction is removed;

b. line means operably attached at a first end thereof to said drum means for being windingly retracted and unwindingly extended therefrom, said line means being operably attachable at a second end thereof to a worker's safety harness;

c. housing means for rotatably mounting said drum means therein, said housing means being operably attachable to an anchorage;

d. gear means selectively positionable in a disengaged operating mode in disengaged relationship with said drum means and an engaged operating mode in engagement with said drum means for turning and being turned by said drum means when in said engaged operating mode;

e. shaft means, having a longitudinal shaft axis, operably associated with said gear means for turning and being turned by said gear means during said engaged operating mode in a first shaft rotation direction associated with said first direction of rotation of said drum means associated with line means extension and a second shaft rotation direction associated with said second direction of rotation of said drum means associated with line means retraction;

f. drive means operably associated with said shaft means for turning said shaft means and for selectively tightening and loosening a clutch means, said drive means being rotatable in a first drive means direction associated with line means extension and a second drive means direction associated with line means retraction;

g. clutch means operably associated with said shaft means and said drive means for use during said gear means engaged operating mode for selectively causing rotational engagement and disengagement of said drive means with said shaft means wherein rotation of said drive means in said first drive means direction associated with line means extension causes adjustable clutching disengagement of said drive means and said shaft means allowing rotation of said shaft means in said first shaft means direction associated with line means extension in response to a load on said line means when said drum means is in said free rotating state, and wherein rotation of said drive means in said first drive means direction subsequent to engagement with a drive means stop cause overriding rotation of said drum means when said drum means is in said locked state and wherein rotation of said shaft means in said first shaft means direction with said drive means in an immobilized position produces clutching engagement of said shaft means and said drive means whereby rotation of said shaft means is brakingly halted, and wherein initial rotation of said drive means in said second drive means direction associated with line means retraction causes adjustable clutching engagement of said drive means and said shaft means and wherein rotation of said drive means in said second drive means direction subsequent to said clutching engagement causes rotation of said shaft means in said shaft means second direction associated with line means retraction;

h. whereby said fall arrester and retrieval apparatus is operational in a fall arrester state associated with said gear means disengaged operating mode, for arresting the fall of a worker attached to said line means, and whereby said fall arrester and retrieval apparatus is operational in an emergency retrieval state associated with said gear means engaged operating mode, for raising or lowering a worker to a selected position subsequent to a fall by rotation of said drive means in said second drive means direction to retract the line means to raise the worker and by rotation of said drive means in said second drive means direction to remove the torque load on said drum means to release the locking mechanism of said drum means and to subsequently permit lowering of the worker by rotation of said drive means in said first drive means direction to cause said clutch means to adjustably disengage said drive means and said shaft means to allow controlled descent of the worker by controlled rotation of said drum means in said first drum means direction and by rotation of said drive means in said first drive means direction subsequent to engagement with a drive means stop to thereby override said drum means resistance to rotation in said locked state to cause lowering of a worker.

30. A cargo handling apparatus comprising:

a. speed sensitive drum means rotatable about a central axis of rotation in a first direction associated with line means extension and a second direction associated with line means retraction, said drum means being biased in said second direction by a biasing torque to prevent slack in associated line means; said drum means being substantially free rotating in said second direction except for said biasing torque; and said drum means being substantially free rotating in said first direction except for said biasing torque, up to a predetermined speed in a drum means free-rotating state; said drum means being adapted to gradually brakingly halt rotation in said first direction at said predetermined rotational speed in a drum means braking state; and said drum means being adapted to lock in a non-rotating position subsequent to said braking so long as an externally applied torque in said first direction of rotation is applied to said drum means and so long as said externally applied torque does not exceed a predetermined override value in a drum means locking state; and said drum means being adapted to unlock and return to said free rotating state when said externally applied torque in said first direction is removed;

b. line means operably attached at a first end thereof to said drum means for being windingly retracted and unwindingly extended therefrom, said line means being operably attachable at a second end thereof to a cargo payload;

c. housing means for rotatably mounting said drum means therein, said housing means being operably attachable to an anchorage;

d. gear means in engagement with said drum means for turning and being turned by said drum means when in said engaged operating mode;

e. shaft means, having a longitudinal shaft axis, operably associated with said gear means for turning and being turned by said gear means in a first shaft rotation direction associated with said first direction of rotation of said drum means associated with line means extension and a second shaft rotation direction associated with said second direction of rotation of said drum means associated with line means retraction;

f. drive means operably associated with said shaft means for turning said shaft means and for selectively tightening and loosening a clutch means, said drive means being rotatable in a first drive means direction associated with line means extension and a second drive means direction associated with line means retraction;

g. clutch means operably associated with said shaft means and said drive means for selectively causing rotational engagement and disengagement of said drive means with said shaft means wherein rotation of said drive means in said first drive means direction associated with line means extension causes adjustable clutching disengagement of said drive means and said shaft means allowing rotation of said shaft means in said first shaft means direction associated with line means extension in response to a load on said line means when said drum means is in said free rotating state, and wherein rotation of said drive means in said first drive means direction subsequent to engagement with a drive means stop cause overriding rotation of said drum means when said drum means is in said locked state and wherein rotation of said shaft means in said first shaft means direction with said drive means in an immobilized position produces clutching engagement of said shaft means and said drive means whereby rotation of said shaft means is brakingly halted, and wherein initial rotation of said drive means in said second drive means direction associated with line means retraction causes adjustable clutching engagement of said drive means and said shaft means and wherein rotation of said drive means in said second drive means direction subsequent to said clutching engagement causes rotation of said shaft means in said shaft means second direction associated with line means retraction;

h. whereby said cargo handling apparatus is operational for raising or lowering a cargo payload to a selected position when said drum means is in said locked state by rotation of said drive means in said second drive means direction to retract the line means to raise the cargo payload, and by initial rotation of said drive means in said second drive means direction to remove the torque load on said drum means to release the locking mechanism of said drum means and to subsequently permit lowering of the cargo payload by rotation of said drive means in said first drive means direction to cause said clutch means to adjustably disengage said drive means and said shaft means to allow controlled descent of the cargo payload by controlled rotation of said drum means in said first drum means direction and by rotation of said drive means in said first drive means direction subsequent to engagement with a drive means stop to thereby override said drum means resistance to rotation in said locked state to cause lowering of the cargo payload.

31. The invention of claim 10 wherein said stop means further comprises a radially extending abutment plate fixedly associated with one face of said pinion gear and at least substantially radially coextensive therewith.

* * * * *